United States Patent
Chavva et al.

(10) Patent No.: US 12,021,661 B2
(45) Date of Patent: Jun. 25, 2024

(54) METHODS FOR FREQUENCY OFFSET TRACKING IN NR MMWAVE FOR EFFICIENT BEAM MANAGEMENT

(71) Applicant: Samsung Electronics Co., Ltd., Suwon-si (KR)

(72) Inventors: Ashok Kumar Reddy Chavva, Bangalore (IN); Sripada Kadambar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 17/420,217

(22) PCT Filed: Feb. 12, 2020

(86) PCT No.: PCT/KR2020/001954
§ 371 (c)(1),
(2) Date: Jul. 1, 2021

(87) PCT Pub. No.: WO2020/166958
PCT Pub. Date: Aug. 20, 2020

(65) Prior Publication Data
US 2022/0070026 A1    Mar. 3, 2022

(30) Foreign Application Priority Data

Feb. 12, 2019  (IN) .............................. 201941005531
Oct. 3, 2019  (IN) .............................. 2019 41005531

(51) Int. Cl.
*H04L 25/02* (2006.01)
*H04B 7/0408* (2017.01)
(Continued)

(52) U.S. Cl.
CPC ....... *H04L 25/0224* (2013.01); *H04B 7/0408* (2013.01); *H04L 5/0048* (2013.01);
(Continued)

(58) Field of Classification Search
None
See application file for complete search history.

(56) References Cited

U.S. PATENT DOCUMENTS 8,416,759 B1    4/2013  Narasimhan et al.
2006/0293087 A1*  12/2006  Tsutsui ................. H04B 7/086
455/562.1
(Continued)

FOREIGN PATENT DOCUMENTS

WO    2014/112841 A1    7/2014
WO    2018/206666 A1    11/2018

OTHER PUBLICATIONS

Indian Examination report dated Sep. 8, 2021, issued in Indian Application No. 201941005531.
(Continued)

*Primary Examiner* — Steve R Young
(74) *Attorney, Agent, or Firm* — Jefferson IP Law, LLP

(57) ABSTRACT

Methods and systems for tracking frequency offset in NR are provided. A user equipment (UE) can compute the frequency offset comprising of crystal frequency drift and Doppler shift. Drift in frequencies generated by crystal oscillators in the UE and a base station are detected and nullified. Doppler shift of a serving beam is estimated using either data collected by sensors in the UE or reference signals received from the base station. Values of Doppler shift for a plurality of beams are estimated using the Doppler shift of the serving beam and sensor data, wherein the serving beam and the
(Continued)

plurality of beams correspond to a same transmitter beam or different transmitter beams, wherein the type of QCL of the beams is either A, B, or C.

16 Claims, 17 Drawing Sheets

(51) Int. Cl.
*H04L 5/00* (2006.01)
*H04W 72/04* (2023.01)
*H04W 72/044* (2023.01)
*H04W 74/00* (2009.01)
*H04W 74/08* (2024.01)
*H04W 74/0833* (2024.01)

(52) U.S. Cl.
CPC ....... *H04W 72/046* (2013.01); *H04W 74/006* (2013.01); *H04W 74/0833* (2013.01)

(56) References Cited

U.S. PATENT DOCUMENTS

| | | | | |
|---|---|---|---|---|
| 2008/0304077 | A1* | 12/2008 | Demarest | G01B 9/02045 356/486 |
| 2015/0349940 | A1 | 12/2015 | Kim et al. | |
| 2018/0034525 | A1 | 2/2018 | Park et al. | |
| 2018/0067203 | A1* | 3/2018 | Lee | H04B 7/0619 |
| 2018/0083719 | A1* | 3/2018 | Kim | H04B 17/104 |
| 2018/0138963 | A1 | 5/2018 | Hernando | |
| 2018/0191416 | A1 | 7/2018 | Palenius et al. | |
| 2019/0335443 | A1* | 10/2019 | Liu | H04B 7/0695 |
| 2020/0067615 | A1* | 2/2020 | Ghanbarinejad | H04B 17/309 |
| 2020/0186232 | A1* | 6/2020 | Levitsky | H04B 7/0617 |
| 2020/0196162 | A1* | 6/2020 | Vargas | H04W 4/40 |
| 2020/0252923 | A1* | 8/2020 | Yerramalli | H04W 72/51 |
| 2020/0266870 | A1* | 8/2020 | Yoon | H04B 17/318 |
| 2021/0048522 | A1* | 2/2021 | Pos | G01S 13/882 |
| 2021/0126679 | A1* | 4/2021 | Yuan | H04L 5/0023 |

OTHER PUBLICATIONS

Rong Zeng et al., 'Joint Estimation of Frequency Offset and Doppler Shift in High Mobility Environments Based on Orthogonal Angle Domain Subspace Projection', IEEE Transactions on Vehicular Technology (vol. 67, Issue: 3, Mar. 2018), Oct. 26, 2017 pp. 2255-2257.

Principles of wireless communication; Feb. 20, 2014.

38.214, 5G NR, Physical layer procedures for data, Mar. 30, 2021.

Downlink synchronization of LTE base stations for opportunistic ToA positioning, Jan. 2015.

Joint Clock and Frequency Synchronization for OFDM-Based Cellular Systems, Dec. 2011.

An overview of signal processing techniques for millimeter wave MIMO systems, Dec. 9, 2015.

Evaluation of AHRS algorithms for inertial personal localization in industrial environments, Jun. 2015.

An efficient orientation filter for inertial and inertial magnetic sensor arrays, Apr. 10, 2010.

Multi-panel MIMO in 5G, Mar. 2018, Key Technologies for 5G New Radio.

On the Phase Tracking Reference Signal (PT-RS) Design for 5G New Radio (NR), Jan. 2018.

ZTE, 3GPP TSG RAN WG1 Meeting #;R1-1709812, Summary of [88b-12] email discussion on QCL types for NR, May 19, 2017, Hangzhou, P.R. China.

Nokia, Alcatel-Lucent Shanghai Bell, 3GPP TSG RAN WG1#89 ; R1-1708929, On QCL Framework and Configurations in NR, May 7, 2017, Hangzhou, P.R. China.

Nokia, Alcatel-Lucent Shanghai Bell, 3GPP TSG RAN WG1#89; R1-1708906, BPL definition and Spatial QCL time indication, May 6, 2017, Hangzhou, P.R. China.

\* cited by examiner

METHODS FOR FREQUENCY OFFSET TRACKING IN NR MMWAVE FOR EFFICIENT BEAM MANAGEMENT

CROSS-REFERENCE TO RELATED APPLICATION(S)

This application is a U.S. National Stage application under 35 U.S.C. § 371 of an International application number PCT/KR2020/001954, filed on Feb. 12, 2020, which is based on and claims priority of an Indian provisional application number 201941005531, filed on Feb. 12, 2019, and an Indian patent application number 201941005531, filed on Oct. 3, 2019, in the Indian Intellectual Property Office, the disclosure of each of which is incorporated by reference herein in its entirety.

BACKGROUND

1. Field

The disclosure relates to 5th Generation (5G) communication networks. More particularly, the disclosure relates to methods and systems for tracking frequency offset in new radio (NR) for efficient beam management.

2. Description of Related Art

Currently, communication devices are configured to estimate parameters, such as coarse frequency offset and Doppler shift, that can cause variations in frequency of a signal, transmitted from a source device (such as a base station), at a receiver device (such as a user equipment (UE)). The frequency offset can be caused due to variations in frequencies generated by crystal oscillators of the source device and the receiver device. The Doppler shift specifies the variations in the frequency of the transmitted signal at the receiver device, caused due to movement of the source/receiver device with respect to the receiver/source device. The Doppler shift causing the variation in the frequency is based on a velocity of the movement of the source/receiver device with respect to the receiver/source device. The communication devices in a wireless communication system can periodically estimate the variations in frequencies of the crystal oscillators of the source device and Doppler shift as part of signal transmission and reception.

FIG. 1 illustrates multiple copies of a wireless signal, transmitted by a source device, being received by a received device according to the related art.

Referring to FIG. 1, the different copies of the signals arrive at the receiver, from the source through different paths (101 and 102). The different paths may have different channel qualities, which is likely to vary with respect to time. If the receiver is in motion with respect to the source, the frequency of the wireless signal at the receiver is likely to be shifted by a value with respect to the source. The shift of the frequency is a function of velocity of the receiver/source with respect to the source/receiver. If the receiver/source is moving with a velocity 'v' with respect to the source/receiver, the frequency shift will be f*v/c, wherein 'c' is the speed of light with frequency of the signal transmitted from the source being 'f'. The receiver can be configured to negate the frequency shift.

FIG. 2 illustrates an architecture of a wireless receiver that can be configured to estimate and eliminate channel effects and frequency offset, comprising of Doppler shift according to the related art.

Referring to FIG. 2, the architecture of a wireless receiver includes frontend 108-0-108-(Mr-1), CP removal 110-0-110-(Mr-1), FFT 112-0-112-(Mr-1), 106, channel estimator module 114, demodulation 120-0-120-(U-1), decoder 122-0-122-(U-1), and an equalizer 116. The wireless receiver comprises of carrier frequency offset (CFO) or Doppler estimation and correction module 118-0-118-(U-1), which can estimate and eliminate the channel effects and the frequency offsets that are likely to cause signal distortion. The estimations can be performed using reference signals, which are periodically transmitted by a base station (source device) 104-0-104-(Mr-1). The wireless receiver allows simultaneous reception from multiple users in single carrier-frequency division multiplexing Access (SC-FDMA) and orthogonal frequency division multiplexing (OFDM) systems.

FIG. 3 illustrates periodic transmission of reference signals by a gNB according to the related art.

In NR, a UE can perform an estimation of frequency offset using the reference signals that are periodically or semi-persistently transmitted by the base station. In an example, the base station can send demodulation reference signals (DMRS), primary/secondary synchronization signals (PSS/SSS), and physical broadcast channel (PBCH) according to the related art.

Referring to FIG. 3, the PSS, SSS, DMRS, and PBCH, are periodically transmitted by a next generation node B (gNB) (base station) periodically in a synchronization signal block (SSB). The base station can configure the UE to utilize the reference signals to perform channel state information and reference signal received power/received signal strength indicator (RSRP/RSSI) computations. In addition to SSBs, the base station may also transmit channel state information-reference signals (CSI-RS) that can be used for performing CSI measurements. In NR, as reference signals and SSB transmissions can be received from the same or different transmission reception points (TRPs) (beams), the gNB indicates type of quasi co-Location (QCL) relation between two reference signals by configuring transmission configuration indication (TCI) state information. The QCL types are, viz., type A (Doppler shift, Doppler spread, average delay, delay spread), type B (Doppler shift, Doppler spread), type C (Doppler shift, average delay) and type D (Spatial Rx parameter).

The reference signals are received, as configured in a UE specific radio resource control (RRC) message or as indicated in a broadcast message. The UE can receive time and frequency mapping along with periodicity of transmission of the reference signals in the RRC message. During measurements, the UE may appropriately combine reference signals depending on the type of QCL. Further, DMRS which is transmitted as part of downlink transmissions can also be used, when applicable. Similarly, for uplink measurements, the gNB may request the UE to transmit a sounding reference signal (SRS) for link adaptation and beam selection. The DMRS is transmitted with data and control channels for channel estimation.

FIG. 4 is a sequence diagram depicting beam switching by a UE according to the related art.

Referring to FIG. 4, at operation 405, the UE can receive initial synchronization signals and system information from the gNB. In operation 410, the gNB can send reference signals, such as SSB and DMRS according to the related art. at operation 415, the UE can estimate frequency offset and Doppler shift using the reference signals. At operation 420, the UE can receive/transmit a physical random access channel (PRACH) from/to the gNB. In operation 425, the UE can receive a physical downlink control channel (PDCCH), which is followed by a physical downlink shared channel (PDSCH) in operation 430. As depicted in operation 425 and in operation 435 of FIG. 4, the PDCCH and PDSCH messages are received by the UE in different beams. The PDSCH is received in a different beam because the UE had performed a beam switch. In operation 440, the UE can estimate the frequency offset and Doppler shift using the reference signals. In operation 445, the UE can receive at least one of CSI-RS or tracking reference signal (TRS) from the gNB. In operation 450, the UE can switch to a new beam for transmission/reception from an existing beam if the new beam is best for communication. In operation 455, the UE can receive CSI-RS/TRS from the gNB. Once the beam switching is performed, in operation 460, the UE re-estimates the frequency offset and Doppler shift using the reference signals. The UE estimating the frequency offset and Doppler shift on a per beam pair configuration basis, can incur an additional cost in terms of delay and computation whenever there is a transmitter or receiver beam switch.

FIG. 5 illustrates a UE performing a beam switching due to motion with respect to a gNB according to the related art.

In beamforming systems, the source device and the receiver device can communicate information using a plurality of beams according to the related art.

Referring to FIG. 5, the UE can communicate with the gNB using any of the five beams, viz., B0, B1, B2, B3, and B4. At a particular instant, the UE can select at least one of the beams which is optimal (in terms of bit error rate (BER), signal to noise ratio (SNR), latency, and so on) for communication. Consider that at time T0, the UE, at location L2, determines that B1 is the optimal beam, based on the direction of transmission/reception of data to/from the gNB. Each of the beams can be characterized by a beam angle 'θ', which specifies a direction along which the beamforming gain is highest for a received or transmitted signal. The beam angle can be at the center of the beam. The angle between the beam directions can be $\theta_{12}$, $\theta_{23}$, and so on. Hence, during signal reception, the UE can determine the optimal beam and utilize the optimal beam for setting up communication with the gNB. Once the optimal beam has been selected, CFO/Doppler estimation, channel estimation, and so on, can be performed by the UE for signal reception specific to the selected optimal beam.

The optimal beam to be used for communication may change over time, due to factors, such as motion of the UE, environmental factors, appearance of obstacles, and so on. As depicted in FIG. 5, at time T1, B2 is the optimal beam at location L2; and at time T2, B3 is the optimal beam at location L3. Hence, the UE may need to determine the optimal beam periodically and switch to the optimal beam prior to communicating with the gNB. After each beam switching operation, the UE needs to perform CFO/Doppler estimation, channel estimation, and so on, for successful signal reception. The estimations, performed at every instance of beam switch, can degrade latency and increase computational cost particularly if the UE is in motion with a high velocity.

FIG. 6 illustrates an architecture of a beamforming system in a communication device that is configured to perform CFO/Doppler estimation and channel estimation according to the related art.

Referring to FIG. 6, the device performs CFO/Doppler estimation and channel estimation for each of the beams that are available to the UE for establishing communication with the gNB. When the device performs a beam switch, the CFO/Doppler and channel estimation modules perform the estimations, which can be utilized by the demodulators during equalization. However, performing the estimation every beam switch increases computational overhead, which is particularly high for the cases, such as high mobility, wherein beam switching is performed frequently.

FIG. 7 is a 2-Dimensional (2D) beam layout of a UE according to the related art.

Referring to FIG. 7, the UE can communicate using 7 beams. The beam angles specifying the directions with maximum gain for each of the 7 beams are 01-07. The directions are fixed and the UE can switch to any of the beams or utilize at least one of the beams, if the UE determines that the beams are optimal. The angular shift in the direction of communication can be computed while performing the beam switching. Although a 2D beam layout is illustrated, the same can be extended to a 3D beam layout, wherein beam angle 'θ' can be represented by a pair of points using the polar coordinate system, indicating the azimuth and zenith angles of the beam.

The above information is presented as background information only to assist with an understanding of the disclosure. No determination has been made, and no assertion is made, as to whether any of the above might be applicable as prior art with regard to the disclosure.

SUMMARY

In New Radio (NR) 5th Generation (5G) systems, which utilize millimeter (mm) waves for communication, estimations of the Doppler shift and variations in frequencies of crystal oscillators are performed by the UE (acting as the receiver device) using reference signals transmitted by the base station (acting as the source device), on a per beam basis. This can result in a higher computational overhead, particularly in the scenarios, wherein the UE is in motion with respect to the base station, as the UE frequently performs beam switching.

Aspects of the disclosure are to address at least the above-mentioned problems and/or disadvantages and to provide at least the advantages described below. Accordingly, an aspect of the disclosure is to provide methods and systems for tracking frequency offset by a user equipment (UE) comprising of crystal frequency drift and Doppler shift in $5^{th}$ Generation (5G) communication systems.

Another aspect of the disclosure is to minimize frequency of computation of the frequency offset, by the UE, using reference signals transmitted by a base station by computing Doppler shift for a plurality of UE beams based on sensor data and estimated Doppler shift of a serving beam, wherein the Doppler shift of the serving beam is determined based on at least one of the reference signals and the sensor data.

Another aspect of the disclosure is to determine Doppler shift for the plurality of UE beams based on sensor data and estimated Doppler shift of the serving beam, wherein the serving beam and the plurality of UE beams correspond to same or different transmitter beams.

Another aspect of the disclosure is to determine velocity of the UE based on values of Doppler shift of a plurality of beams determined using the reference signals and sensor data.

Another aspect of the disclosure is to provide methods and systems for tracking frequency offset by a UE comprising of crystal frequency drift and Doppler shift in 5G communication systems.

Another aspect of the disclosure is to provide methods and systems for minimizing frequency of computation of the frequency offset, by the UE, using reference signals transmitted by a base station by computing Doppler shift for a plurality of UE beams based on sensor data and estimated Doppler shift of a serving beam, wherein the Doppler shift of the serving beam is determined based on at least one of the reference signals and the sensor data.

Another aspect of the disclosure is to provide methods and systems for determining Doppler shift for the plurality of UE beams based on sensor data and estimated Doppler shift of the serving beam, wherein the serving beam and the plurality of UE beams correspond to same or different transmitter beams.

Another aspect of the disclosure is to provide methods and systems for determining velocity of the UE based on values of Doppler shift of a plurality of beams determined using the reference signals and sensor data.

Additional aspects will be set forth in part in the description which follows and, in part, will be apparent from the description, or may be learned by practice of the presented embodiments.

In accordance with an aspect of the disclosure, methods and systems for tracking frequency offset by a UE comprising of crystal frequency drift and Doppler shift in 5G communication systems are provided. The methods and systems include detecting and nullifying drift in frequencies generated by crystal oscillators in a UE and a base station. The embodiments include estimating Doppler shift of a serving beam through data collected by at least one sensor present in the UE and at least one reference signal received from the base station. The embodiments include estimating values of Doppler shift of a plurality of beams using the estimated Doppler shift of the serving beam and sensor data, wherein type of QCL of the serving beam and the plurality of beams are either of type A, B, or C, wherein the serving beam and the plurality of beams correspond to a same transmitter beam or different transmitter beams with QCL of type A, B, or C.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings will be more apparent from the following description taken in conjunction with the accompanying drawings, in which.

Throughout the drawings, like reference numerals will be understood to refer to like parts, components, and structures.

DETAILED DESCRIPTION

Figure 1:
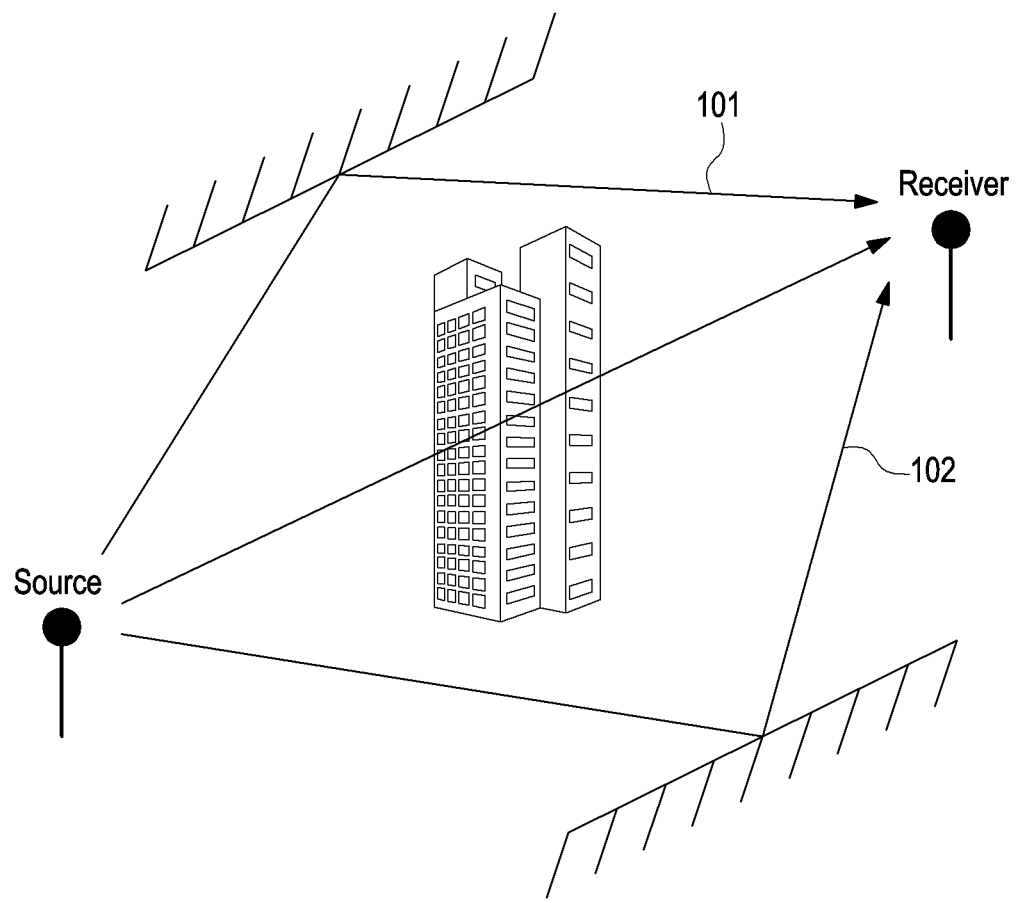
FIG. 1 illustrates multiple copies of a wireless signal, transmitted by a source device, being received by a received device according to the related art.
Figure 2:
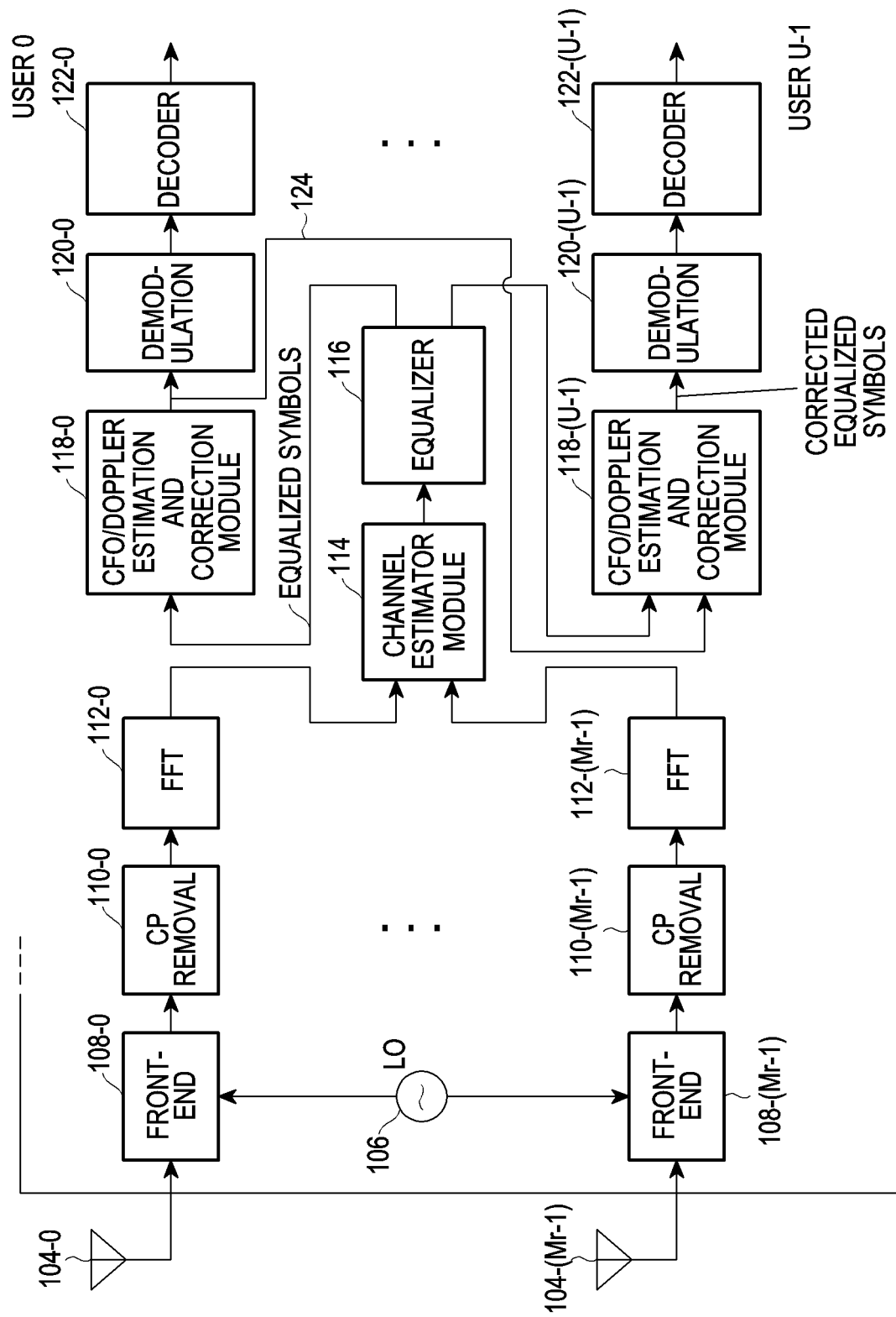
FIG. 2 illustrates an architecture of a wireless receiver that can be configured to estimate and eliminate channel effects and frequency offset, comprising of Doppler shift according to the related art.
Figure 3:
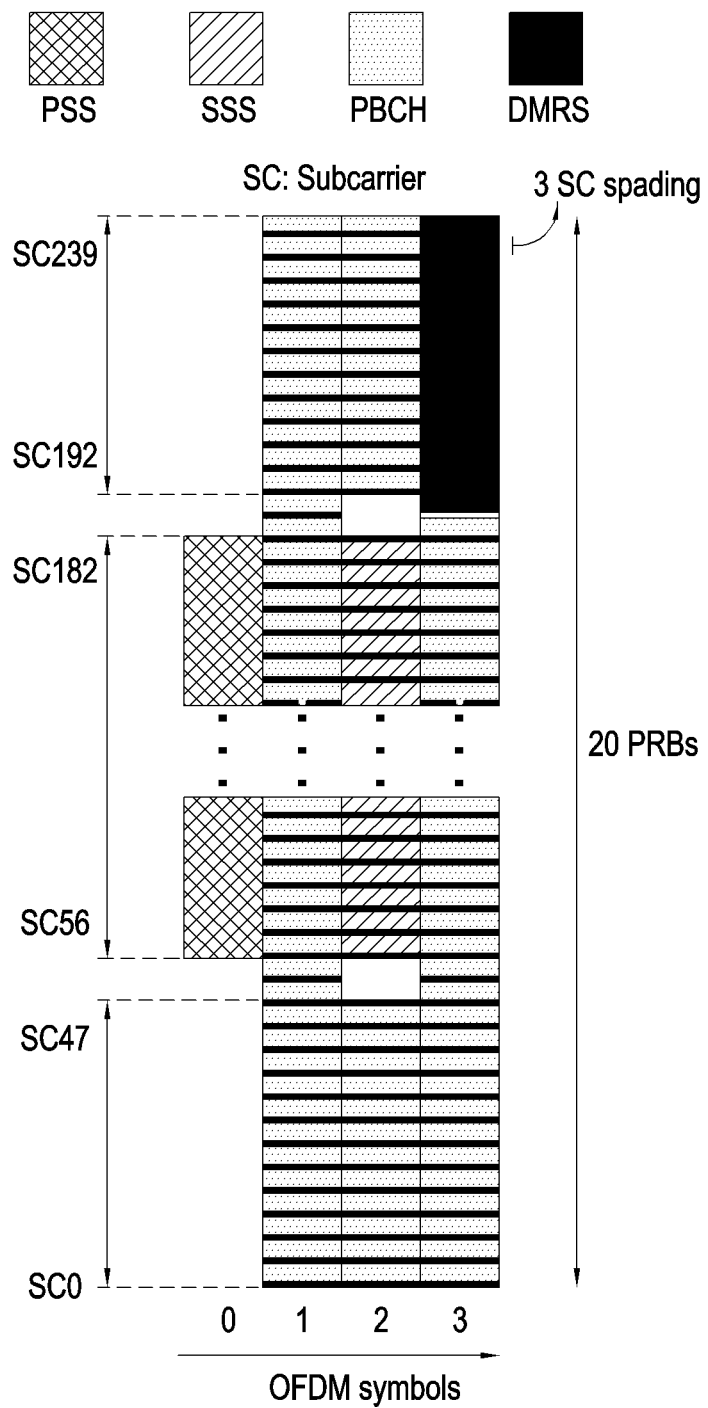
FIG. 3 illustrates periodic transmission of reference signals by a next generation node B (gNB) according to the related art.
Figure 4:
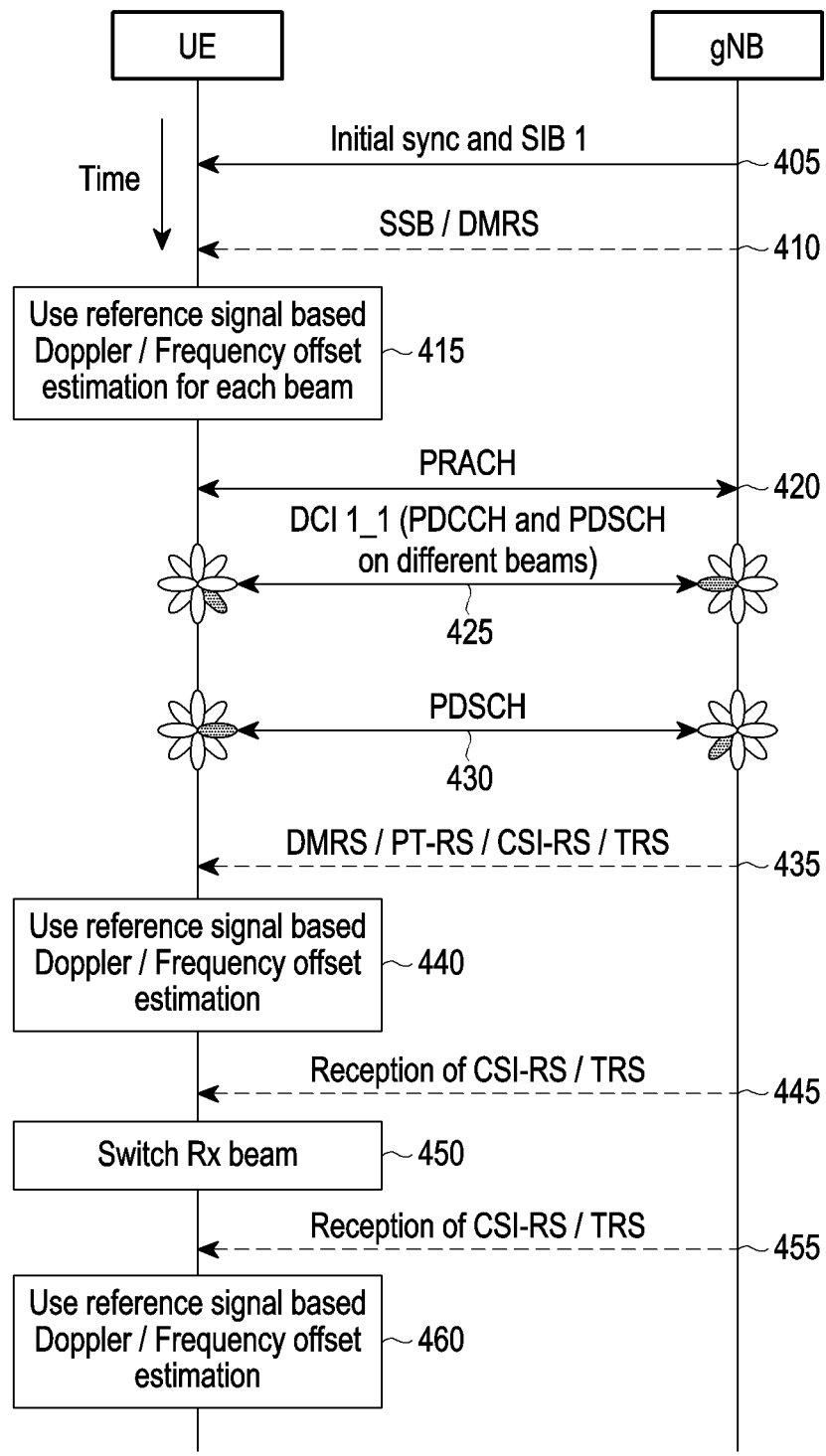
FIG. 4 is a sequence diagram depicting beam switching by a user equipment (UE) according to the related art.
Figure 5:
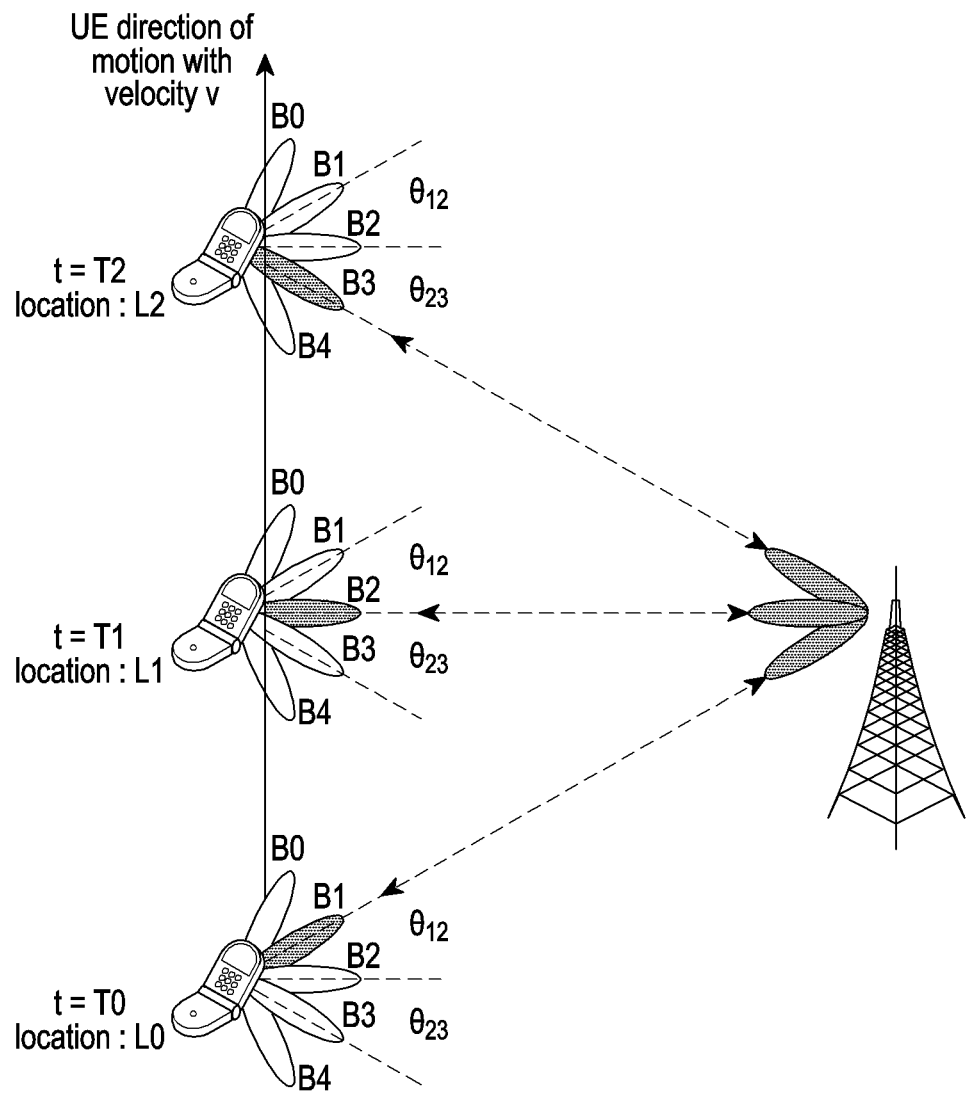
FIG. 5 illustrates a UE performing a beam switching due to motion with respect to a gNB according to the related art.
Figure 6:
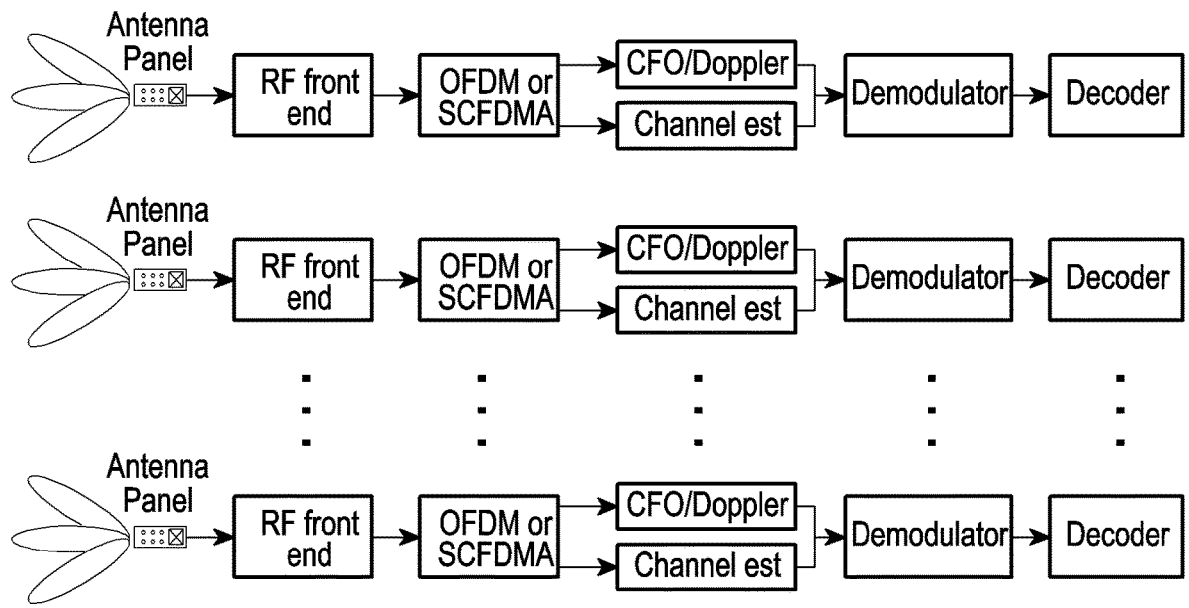
FIG. 6 illustrates an architecture of a beamforming system in a communication device that is configured to perform center frequency offset (CFO)/Doppler estimation and channel estimation according to related art.
Figure 7:
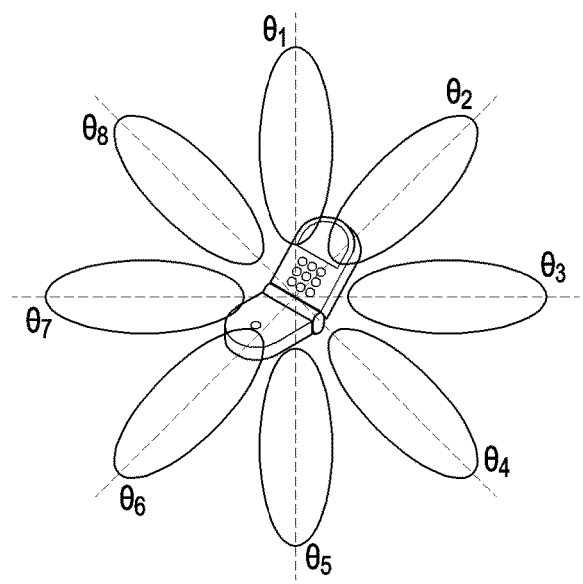
FIG. 7 is a 2-Dimensional (2D) beam layout of a UE according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognized that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments herein disclose methods and systems for tracking frequency offset comprising of crystal frequency drift and Doppler shift in 5th Generation (5G) communication systems. The embodiments include detecting and nullifying drift in frequencies generated by crystal oscillators in a user equipment (UE) and a base station. The embodiments include estimating Doppler shift of a serving beam through data collected by at least one sensor present in the UE and at least one reference signal received from the base station. The embodiments include estimating values of Doppler shift of a plurality of beams using the estimated Doppler shift of the serving beam and sensor data, wherein type of quasi co-location (QCL) of the serving beam and the plurality of beams are either of type A, B, or C, wherein the serving beam and the plurality of beams correspond to a same transmitter beam or different transmitter beams with QCL of type A, B, or C.

Referring now to the drawings, and more particularly to FIGS. 8A through 16, where similar reference characters denote corresponding features consistently throughout the figures, there are shown preferred embodiments.

Figure 8A:
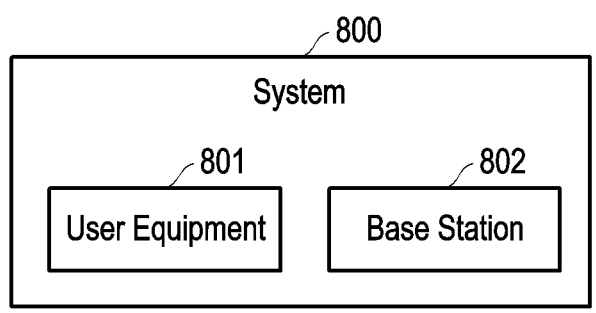
FIGS. 8A and 8B illustrate various units of a system configured to track frequency offset according to various embodiments of the disclosure.
Figure 8B:
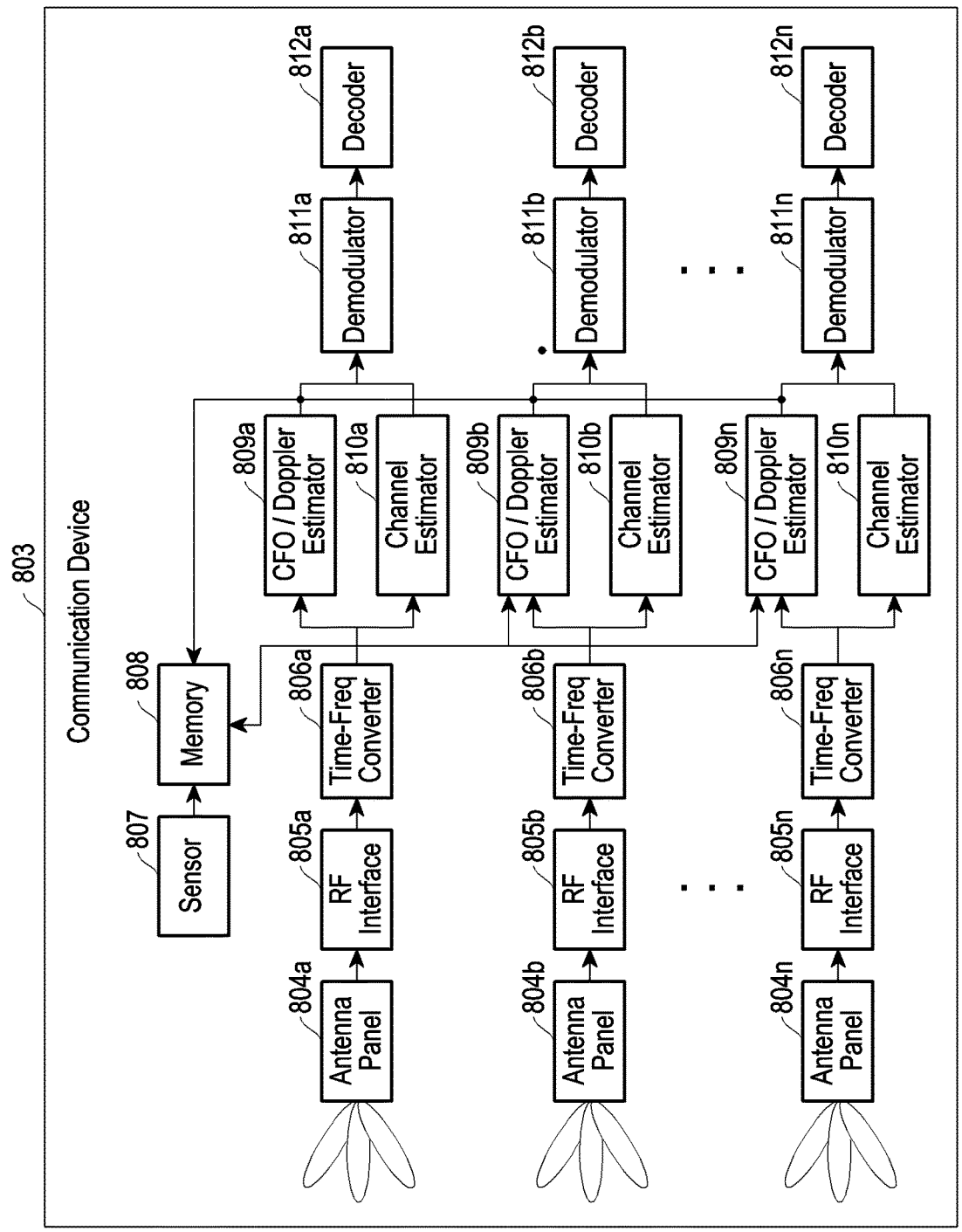

FIGS. 8A and 8B illustrate various units of a system configured to track frequency offset according to various embodiments the disclosure.

Referring to FIG. 8A, a system 800 comprises at least one UE 801 and a base station 802. The base station 802 can be an eNB or a gNB. If the UE 801 acts as a receiver device, the base station 802 can act as the source device. On the other hand, if the base station 802 acts as the receiver device and the UE 801 can act as the source device. The system 800 is configured to track frequency offset caused by variations in frequencies generated by crystal oscillators in the UE 801 and the base station 802.

It can be noted that the system can comprise of the UE 801 and a second UE (instead of the base station 802), wherein either of the UEs can act as the source or the destination device.

The communication device 803, as depicted in FIG. 8B, can act as the source device or the receiver device. Therefore, components of the communication device 803 can be present in both the UE 801 and the base station 802. The components of the communication device 803 can include a plurality of antenna panels 804a-n, RF interfaces 805a-n, time-frequency converters 806a-n, a sensor panel 807, a memory 808, CFO/Doppler estimators 809a-n, channel estimators 810a-n, demodulators 811a-n, and decoders 812a-n. The communication device 803 includes at least one crystal oscillator (not shown) for generating frequencies. In an embodiment of the disclosure, the antenna panels 804a-n can use one crystal oscillator for generating frequencies. In another embodiment of the disclosure, each of the antenna panel (804a-n) can use individual crystal oscillators to generate frequencies.

The UE 801 can communicate with the base station 802 through at least one of a plurality of beams. Each of the beams can be characterized by a beam angle 'θ', which specifies a direction along which the beamforming gain is highest for a received or transmitted signal. For the sake of illustration, 3 beams generated by each antenna panel 804a-n have been depicted.

Consider that at time instant T1, the UE 801 is using a beam B1 generated by the antenna panel 804a for communicating with the base station 802. The beam B1 can be referred to as serving beam, as B1 is being used by the UE 800 for communicating with the base station 802. Consider Omi is an angle between a unit vector along the direction of motion of the UE 801 and the serving beam B1.

The UE 801 can determine that B1 is the serving beam and the angle $\theta_{m1}$ based on data obtained from the sensor panel 807 of the UE 801. In an embodiment of the disclosure, the velocity of motion of the UE 801 can be based on data obtained from the sensor panel 807. If the velocity of motion of the UE 801 is 'v', the Doppler estimate caused by motion of the UE 801 is given by Equation 1:

$$D_{b1} = \frac{v^* \cos(\theta_{m1})}{c} * f_c \qquad \text{Equation 1}$$

wherein 'c' is the velocity of light and fc is the centre frequency or frequency of operation of the base station 802.

If $\Delta_{FO}$ is the frequency offset caused due to differences in frequencies generated by crystal oscillators of the UE 801 and the base station 802, the total frequency offset estimate is given by Equation 2:

$$D_{T1} = \Delta_{FO} + D_{b1} \qquad \text{Equation 2}$$

The UE 801 can determine Doppler shift estimate for any other beam based on the value of $D_{b1}$. Consider that the UE 801 attempts to estimate the Doppler shift for a beam B2. It can be noted that B2 can be a beam that generated either by the antenna panel 804a or any of the other antenna panels 804b-804n. Consider $\theta_{12}$ as the angle between the B1 and B2, and $\theta_{m2}$ as the angle between the unit vector along the direction of motion of the UE 801 and the serving beam B2, wherein $\theta_{m2} = \theta_{m1} + \theta_{12}$. The UE 801 can determine the angle between the beams B1 and B2 using the sensor panel 807.

Consider (for simplicity) that the velocity of motion of the UE 801 remains constant, i.e., 'v', the Doppler estimate caused by motion of the UE 801 is given by Equation 3:

$$D_{b2} = v * \frac{\cos(\theta_{m1} \pm \theta_{12})}{c} * f_c \qquad \text{Equation 3}$$

The total frequency offset estimate is given by: $D_{T2} = \Delta_{FO} + D_{b2}$. Based on the comparison of $D_{b1}$ and $D_{b2}$, the following relation can be defined by Equation 4:

$$D_{b2} = D_{b1} * \frac{\cos(\theta_{m1} \pm \theta_{12})}{\cos(\theta_{m1})} \qquad \text{Equation 4}$$

Consider that DTI is determined at time T1. The $\Delta_{FO}$ can be initially high (prior to or just after UE 801 registration/attach procedure). The $\Delta_{FO}$ can be estimated during initial cell search and operating crystal frequency at the UE 801 can be synchronized with the crystal frequency of the base station 802. Once the registration/attach procedure is completed, the value of $\Delta_{FO}$ may not be significant. This is because $\Delta_{FO}$ is characterized by the crystal clock drift, which can be periodically estimated and corrected. Hence, if the total frequency offset $D_{T2}$ is determined at time T2, it can be assumed that $\Delta_{FO}$ is 0 at time T2. Therefore, $D_{b2}$ can be equal to $D_{T2}$.

In an example, consider that the UE 801 performs a beam switching at time T2, wherein B2 becomes the serving beam (from B1) at time T2 after the beam switching procedure. The UE 801 can perform the beam switching after determining that the beam B2 is optimal for communicating with the base station 802. The UE 801 can determine the optimality of a beam based on angle of arrival of signals from the base station 802. The UE 801 can determine the Doppler shift for the beam B2 based on the Doppler shift for the beam B1.

The UE 801 can initially determine $\Delta_{FO}$, $D_{b1}$, and $D_{b2}$, which can be characterized by velocity of motion of the UE 801 and an angle of arrival of signals from the base station 802 to the UE 801, using reference signals transmitted by the base station 802. The impact of the Doppler shift can be less pronounced if the channel is slow varying. However, if the UE 801 is in motion, the impact of Doppler shift can be significant. The Doppler shift can degrade accuracy of channel estimation. Therefore, the UE 801 can utilize the reference signals for frequency offset tracking.

Once the UE 801 determines the frequency offset ($\Delta_{FO}$ and $D_T$) using reference signals, the UE 801 can utilize sensor data, collected by the sensor panel 807, to estimate values of Doppler shift. When the UE 801 performs beam switching (for example: B1 to B2), the current value of Doppler shift ($D_{B2}$) can be determined based on the previous value of Doppler shift ($D_{B1}$). The UE 801 can store the estimated values of Doppler shift in the memory 808. The UE 801 can retrieve the previous values of Doppler shift from the memory 808 when estimating the current Doppler shift.

The UE 801 can perform frequency offset tracking by computing the Doppler shift, when the serving beam is B2 (due to beam switching), based on the previously computed Doppler shift when the serving beam was B1. The UE 801 can, however, periodically determine the frequency offset (Once the UE 801 determines the frequency offset ($\Delta_{FO}$ and $D_T$) based on the reference signals for ensuring accuracy of $\Delta_{FO}$ and Doppler shift estimation, and channel estimation.

The UE 801, with information of previous active beam and relative direction of previous beam and current (serving) beam, can derive Doppler estimates when the current beam is used for communicating with the base station 802. This allows the UE 801 to avoid independent computation of frequency offset using the reference signals transmitted by the base station 802.

FIGS. 8A and 8B illustrate various units of the system 800, but it is to be understood that other embodiments are not limited thereon. In other embodiments of the disclosure, the system 800 may include less or more number of units. Further, the labels or names of the units are used only for illustrative purpose and does not limit the scope of the invention. One or more units can be combined together to perform same or substantially similar function in the system 800.

Figure 9:
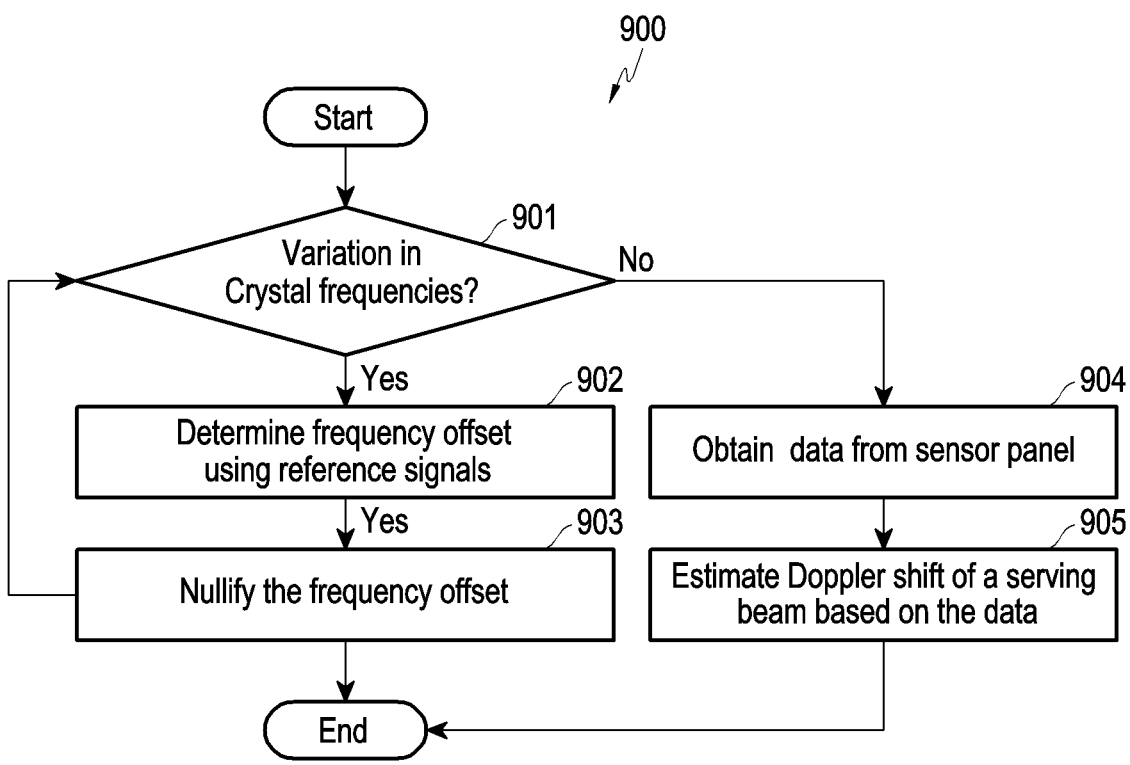
FIG. 9 is a flowchart depicting a method for estimating Doppler shift for a beam using data collected by sensors according to an embodiment of the disclosure.

FIG. 9 is a flowchart 900 depicting a method for estimating Doppler shift for a beam using data collected by sensors according to an embodiment of the disclosure.

Referring to FIG. 9, at operation 901, the method includes determining whether there is frequency offset caused by variations in frequencies generated by crystal oscillators in a source device and a receiver device. This can be achieved by performing reference signal based estimation with a predetermined periodicity using a timer or alternatively, by estimating the Doppler shift upon reception of reference signals and applying correction if the estimated shift is beyond a predetermined threshold. The frequency offset can be characterized by the drift in clocks of the crystals in the source and receiver devices. The crystal clock drift can be periodically estimated and corrected. The variations can be removed by synchronizing the clocks of the crystals of the source and receiver devices.

If the variations in frequencies generated by crystal oscillators are present, the method includes, at operation 902, performing time and frequency tracking (determining frequency offset) using reference signals. Consider that the UE 801 is acting as the receiver device and the base station 802 is acting as the source device. The base station 802 can send the reference signals to the UE 801. The UE 801 can determine a frequency offset comprising of Doppler shift for a serving beam and variations in frequencies of crystal oscillators using the reference signals. The serving beam is the beam used by the UE 801 for communicating with the base station 802. At operation 903, the method includes nullifying the effects of frequency offset caused due to Doppler shift and variations in the crystal frequencies.

Once the variations in frequencies generated by crystal oscillators are nullified, the method includes, at operation 904, obtaining data from the sensor panel 807. The data comprises of an angle between a unit vector along a direction of motion of the receiver/source device with respect to the source/receiver device and the serving beam, and velocity of motion of the receiver/source device. If the UE 801 is considered as the receiver device and the base station is considered as the source device, the sensor panel 807 in the UE 801 can determine the angle between the unit vector along the direction of motion of the UE 801 and the serving beam. The sensor panel can also determine the velocity of motion of the UE 801 with respect to the base station 802. As the base station 802 is considered to be fixed, the velocity refers to the velocity of movement of the UE 801.

At operation 905, the method includes estimating the Doppler shift for the serving beam based on the data obtained from the sensor panel 807, i.e., angle between a unit vector along the direction of motion and the serving beam. The estimated value of Doppler shift can be stored in a memory 808 of the source/receiver device. The estimated value of Doppler shift can be used for estimating values of Doppler shift of all the other beams. Consider that the UE 801 performs beam switching after determining that a current serving beam (current serving beam is the beam which is determined as optimal after beam switching). The UE 801 may not utilize the reference signals broadcasted by the UE 801 to estimate the Doppler shift each time beam switching is performed (which can be performed frequently, if the UE 801 is in motion). This can minimize computational overhead.

If the source/receiver device includes multiple antenna panels, which are driven by a plurality of crystals, then an estimated value of Doppler shift corresponding to a beam generated by an antenna panel cannot be used for estimating a value of Doppler shift corresponding to a beam generated by another antenna panel. If the multiple antenna panels are driven by a single crystal source then an estimated value of Doppler shift corresponding to a beam generated by an antenna panel can be used for estimating a value of Doppler shift corresponding to a beam generated by another antenna panel.

The various actions in the flowchart 900 may be performed in the order presented, in a different order, or simultaneously. Further, in some embodiments of the disclosure, some actions listed in FIG. 9 may be omitted.

Figure 10:
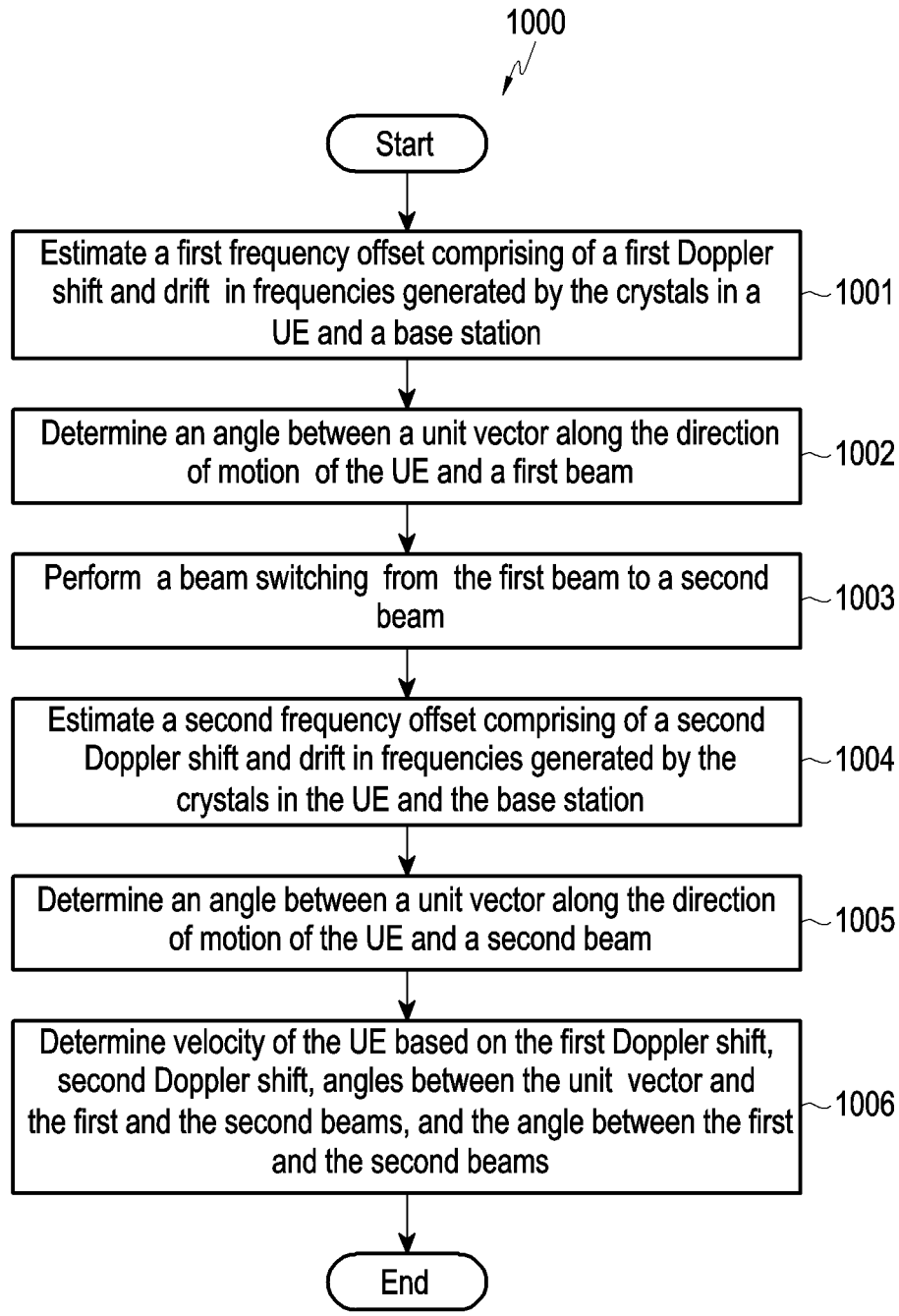
FIG. 10 is a flowchart depicting a method for estimating a velocity of a UE using reference signals and sensor data according to an embodiment of the disclosure.

FIG. 10 is a flowchart 1000 depicting a method for estimating a velocity of a UE 801 using reference signals and sensor data, according to an embodiment of the disclosure.

Referring to FIG. 10, at operation 1001, the method includes estimating a first frequency offset comprising of a first Doppler shift and drift in frequencies generated by the crystals in the UE 801 and the base station 802. The first frequency offset can correspond to a first beam, acting as a serving beam. The embodiments include determining the first frequency offset using reference signals received from the base station 802.

The first frequency offset can be expressed as: $D_1 = \Delta_{FO} + D_{b1}$, wherein $\Delta_{FO}$ represents the drift in frequencies generated by the crystals in the UE 801 and the base station 802, and $D_{b1}$ represents the first Doppler shift.

At operation 1002, the method includes determining an angle between a unit vector along the direction of motion of the UE 801 and the first beam, acting as the serving beam. The angle can be represented as $\theta_{m1}$. The angle $\theta_{m1}$ can be determined using sensor data obtained from the sensor panel 807 in the UE 801.

At operation 1003, the method includes performing a beam switching. The UE 801 can switch to a second beam on determining that the second beam is optimal for communicating with the base station 802. The optimality can be based on gain of signals received from the base station 802. The UE 801 can switch to the second beam from the first beam on determining that the gain of the signals received from the base station 802 is likely to be highest, if the second beam is used for communicating with the base station 802, as compared to the first beam or any other beams. It is assumed that the direction of motion of the UE 801 is unchanged prior to and after beam switching.

At operation 1004, the method includes estimating a second frequency offset comprising of a second Doppler shift and drift in frequencies generated by the crystals in the UE 801 and the base station 802. The second frequency offset, corresponding to the second beam, can act as a serving beam after beam switching. The second frequency offset can be determined using the reference signals received from the base station 802.

The second frequency offset can be expressed as: $D_2 = \Delta_{FO} + D_{b2}$, wherein $\Delta_{FO}$ represents the drift in frequencies generated by the crystals in the UE 801 and the base station 802, and $D_{b2}$ represents the second Doppler shift. It can be assumed that the value of $\Delta_{FO}$ is small as the drift in the crystal frequencies is frequently estimated and compensated.

At operation 1005, the method includes determining an angle between the unit vector along the direction of motion of the UE 801 and the second beam, acting as the serving beam. The angle can be represented as $\theta_{m2}$. The angle $\theta_{m2}$ can be determined using sensor data obtained from the sensor panel 807 in the UE 801. The UE 801 can determine an angle between the first beam and the second beam using sensor data obtained from the sensor panel 807. The angle between the first beam and the second beam can be represented as 012. The angle $\theta_{m2}$ can be expressed as: $\theta_{m2} = \theta_{m1} + \theta_{12}$. The angle $\theta_{m2}$ is dependent on the beam angles (direction along which gain of a particular beam is maximum) of the first beam and the second beam. Thus, $\theta_{m2}$ can be derived based on 0 ml.

At operation 1006, the method includes determining the velocity of the UE 801 based on the values of the first Doppler shift, the second Doppler shift, the angle between the unit vector and the first beam, the angle between the unit vector and the second beam, and the angle between the first beam and the second beam. The velocity of motion of the UE 801, 'v' can be derived by Equation 5 through Equation 8:

$$D_2 - D_1 = (\Delta_{FO} + D_{b2}) - (\Delta_{FO} + D_{b2}) \qquad \text{Equation 5}$$

$$D_2 - D_1 = (\Delta_{FO} + D_{b2}) - (\Delta_{FO} + D_{b2}) = \qquad \text{Equation 6}$$
$$\frac{v}{c} * \cos(\theta_{m1} \pm \theta_{12}) * f_c - \frac{v}{c} * \cos(\theta_{m1}) * f_c$$

$$\frac{v}{c} * \cos(\theta_{m1} \pm \theta_{12}) * f_c - \frac{v}{c} * \cos(\theta_{m1}) * f_c = \qquad \text{Equation 7}$$
$$v * \frac{f_c}{c} * (\cos(\theta_{m1} \pm \theta_{12}) - (\cos(\theta_{m1}))$$

$$v = (D_{T2} - D_{T1}) * \frac{c}{f_c} * \frac{1}{(\cos(\theta_{m1} \pm \theta_{12}) - (\cos(\theta_{m1}))} \qquad \text{Equation 8}$$

The various actions in the flowchart 1000 may be performed in the order presented, in a different order, or simultaneously. Further, in some embodiments of the disclosure, some actions listed in FIG. 10 may be omitted.

Figure 11:
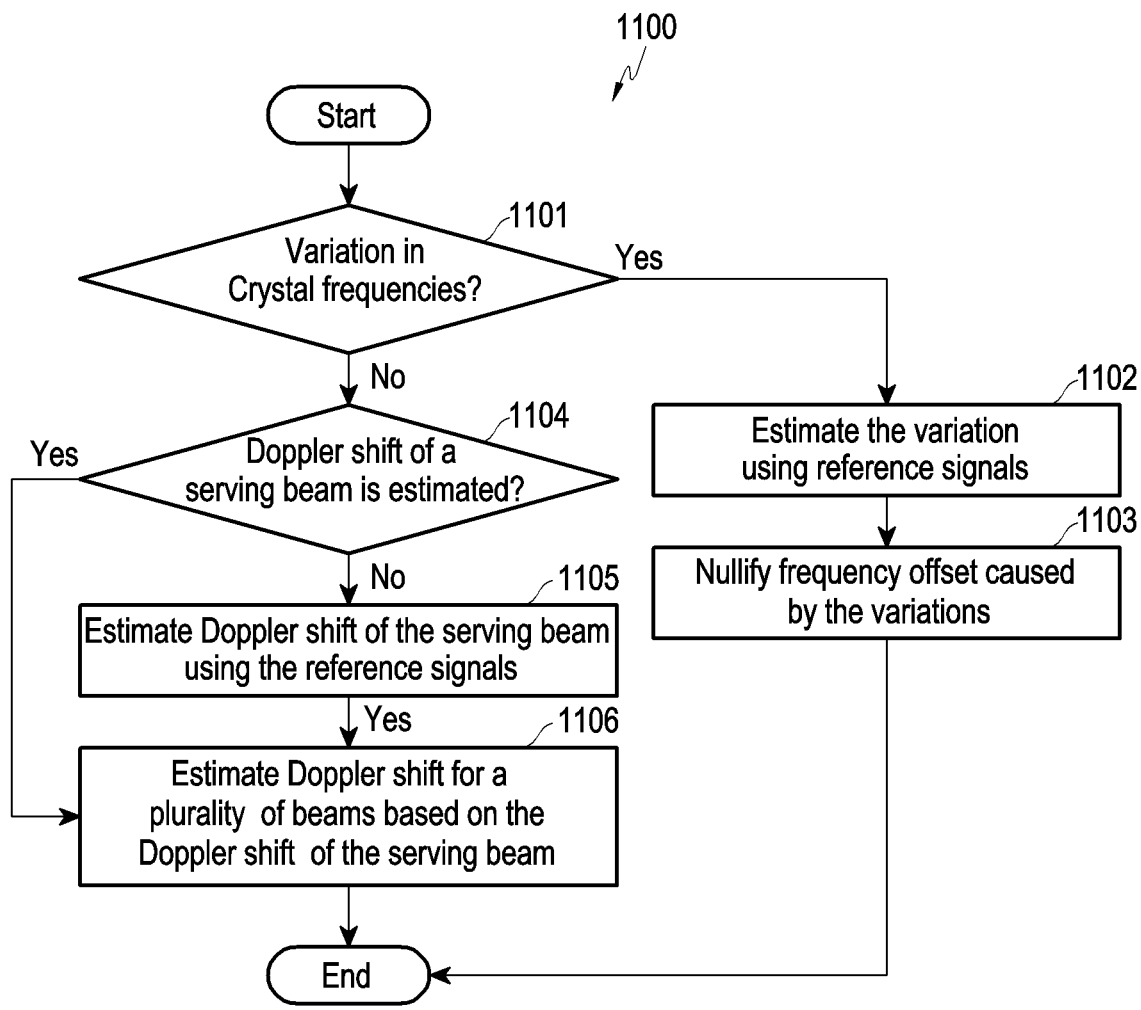
FIG. 11 is a flowchart depicting a method for estimating Doppler shift of multiple receiver device beams using reference signals and sensor data according to an embodiment of the disclosure.

FIG. 11 is a flowchart 1100 depicting a method for estimating Doppler shift of multiple receiver device beams using reference signals and sensor data, according to an embodiment of the disclosure. Consider that the UE 801 acts as the receiver device and the base station 802 acts as the source device. The base station 802 communicates with the UE 801 using a single beam and the UE 801 can communicate with the base station 802 using a plurality of beams.

Referring to FIG. 11, at operation 1101, the method includes determining whether there is a frequency offset caused by variations in frequencies generated by crystal oscillators in the UE 801 and the base station 802. If it is determined that the variations in the frequencies generated by crystal oscillators are present, the method includes, at operation 1102, estimating the variations using the reference signals received from the base station 802. At operation 1103, the method includes nullifying the frequency offset caused by the variations in the frequencies generated by crystal oscillators of the UE 801 and the base station 802.

Once it is determined that the crystal oscillators in the UE 801 and the base station 802 have been synchronized by nullifying drifts in the crystal clocks causing the variations in the frequencies generated by the UE 801 and the base station 802, the method includes, at operation 1104, determining whether Doppler shift for the serving beam, or any of the plurality of beams at the UE 801, has been estimated. If it is determined that the Doppler shift of at least one of the beams at the UE 801 have not been estimated, the method includes, at operation 1105, estimating the Doppler shift of the serving beam using the reference signals.

At operation 1106, the method includes estimating the values of Doppler shift of each of the plurality of beams based on the value of Doppler shift of the serving beam. Once the value of Doppler shift corresponding to the serving beam has been estimated, the UE 801 can determine the values of the Doppler shifts corresponding to each of the plurality of the beams based on sensor data (velocity of motion of the UE, angles between the serving beam and each of the plurality of beams, and angle between the unit vector in the direction of motion of the UE 801 and the serving beam) and the estimated value of the Doppler shift corresponding to the serving beam.

The various actions in the flowchart 1100 may be performed in the order presented, in a different order, or simultaneously. Further, in some embodiments of the disclosure, some actions listed in FIG. 11 may be omitted.

Figure 12:
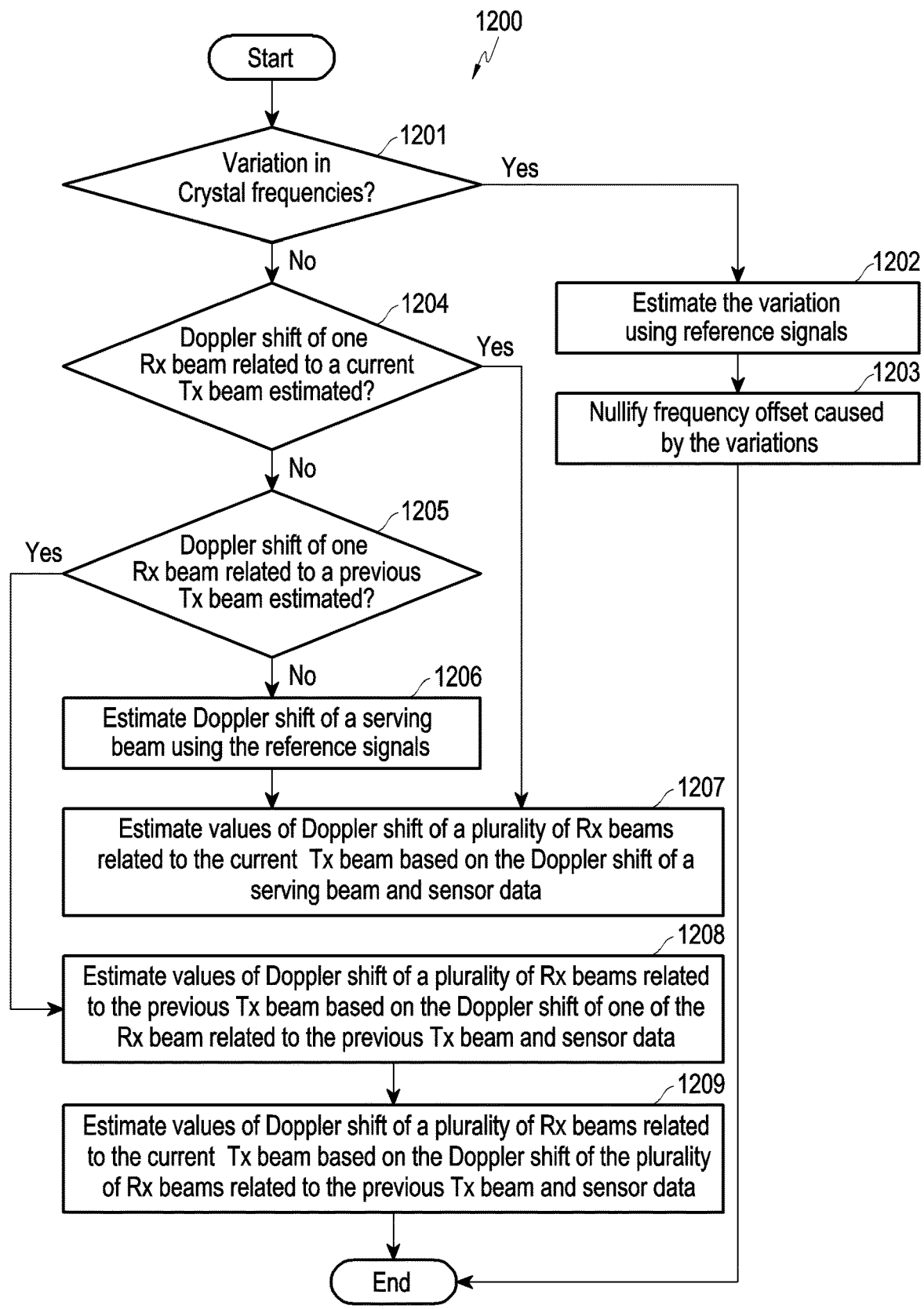
FIG. 12 is flowchart depicting a method for estimating Doppler shift of multiple receiver device beams using reference signals and sensor data according to an embodiment of the disclosure.

FIG. 12 is a flowchart 1200 depicting a method for estimating Doppler shift of multiple receiver device beams using reference signals and sensor data, according to an embodiment of the disclosure. Consider that the UE 801 acts as the receiver device and the base station 802 acts as the source device. The base station 802 communicates with the UE 801 using a plurality of transmitter beams and the UE 801 can communicate with the base station 802 using a plurality of receiver beams.

Referring to FIG. 12, at operation 1201, the method includes determining whether there is a frequency offset caused by variations in frequencies generated by crystal oscillators in the UE 801 and the base station 802. If it is determined that there are variations in the frequencies generated by crystal oscillators, the method includes, at operation 1202, estimating the variations using the reference signals received from the base station 802. At operation 1203, the method includes nullifying the frequency offset caused by the variations in the frequencies generated by crystal oscillators of the UE 801 and the base station 802.

Once it is determined that the crystal oscillators in the UE 801 and the base station 802 have been synchronized by nullifying drifts in the crystal clocks causing the variations in the frequencies generated by the UE 801 and the base station 802, the method includes, at operation 1204, determining whether value of Doppler shift of one of the plurality of receiver beams, corresponding to a current transmitter beam, has been estimated. If the values of Doppler shift of none of the plurality of receiver beams have been estimated, the method includes, at operation 1205, determining whether value of Doppler shift of one of a plurality of receiver beams, corresponding to a previous transmitter beam has been estimated.

If it is determined that the value of Doppler shift of one of the receiver beams corresponding to the previous transmitter beam have been estimated, the method includes, at operation 1208, estimating the values of Doppler shift of each of the plurality of receiver beams corresponding to the previous transmitter beam based on the value of Doppler shift of the one of the receiving beams corresponding to the previous transmitter beam and the sensor data. However, prior to the estimation (at operation 1208), it needs to be ensured that the type of QCL of the previous transmitter beam and the type of QCL of the current transmitter beam is either of the type A, B, or C. This is because, the value of Doppler shift of the plurality of receiver beams corresponding to the previous transmitter beam cannot be used for estimating the value of Doppler shift of a receiver beam corresponding to the current transmitter if the types of QCL of the previous transmitter beam and the current transmitter beam is not one of the types A, B, or C. At operation 1209, the method includes estimating the values of Doppler shift of each of the receiver beams corresponding to the current transmitter beam based on the estimated values of Doppler shift of the receiver beams corresponding to the previous transmitter beam and the sensor data.

If it is determined that the value of Doppler shift of one of the receiver beams corresponding to the previous transmitter beam has not been estimated, the method includes, at operation 1206, estimating value of Doppler shift of the serving beam (serving beam corresponds to the current transmitter beam) using reference signals received from the base station 802.

At operation 1207, the method includes estimating the values of Doppler shift of each of the plurality of receiver beams corresponding to the current transmitter beam based on the estimated value of Doppler shift of the serving beam. Once the value of Doppler shift corresponding to the serving beam has been estimated, the values of the Doppler shifts corresponding to each of the plurality of the receiver beams corresponding to the current transmitter beam can be estimated based on the sensor data and the estimated value of the Doppler shift corresponding to the serving beam.

If it is determined (at operation 1204) that the value of Doppler shift of one of the plurality of receiver beams corresponding to the current transmitter beam has been estimated, the Doppler shift of each of the plurality of receiver beams corresponding to the current transmitter beams can be estimated (operation 1207) based on the estimated value of Doppler shift of one of the plurality of receiver beams corresponding to the current transmitter beam. However, it is to be noted that the types of QCL of the current transmitter beam and the previous transmitter beam are either of type A, B, or C.

The various actions in the flowchart 1200 may be performed in the order presented, in a different order, or simultaneously. Further, in some embodiments of the disclosure, some actions listed in FIG. 12 may be omitted.

Figure 13:
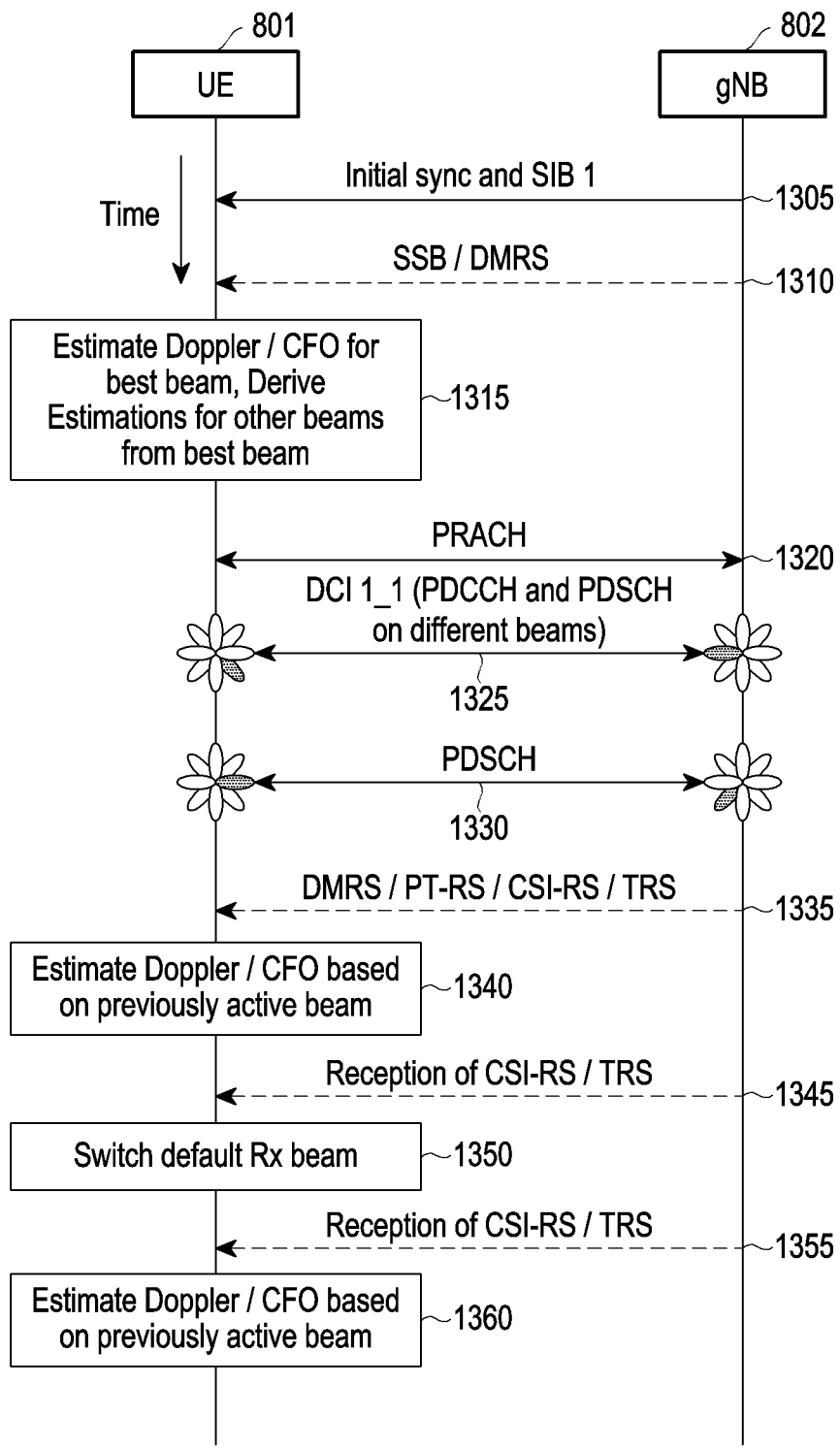
FIG. 13 is a sequence diagram depicting estimation of Doppler shift of a serving beam in an event of beam switching by a UE according to an embodiment of the disclosure.

FIG. 13 is a sequence diagram depicting estimation of Doppler shift of a serving beam in an event of beam switching by a UE according to an embodiment of the disclosure. Consider that the base station 802 is a gNB.

Referring to FIG. 13, at operation 1305, The UE 801 can receive initial synchronization signals and system information from the gNB 802. Thereafter, in operation 1310, the gNB 802 can send reference signals, such as synchronization signal block (SSB) and demodulation reference signal (DMRS). In operation 1315, The UE 801 can estimate the total frequency offset, comprising of drifts in frequencies generated by the crystal oscillators in the UE 801 and the gNB 802, and the Doppler shift; using the reference signals. The UE 801 can also estimate the Doppler shift of the serving beam based on the sensor data. In operation 1320, the UE can receive/transmit a physical random access channel (PRACH) from/to the gNB. In operation 1325, the UE can receive a physical downlink control channel (PDCCH), which is followed by a physical downlink shared channel (PDSCH). As depicted in operation 1325 and in operation 1330 of FIG. 13, the PDCCH and PDSCH messages are received by the UE in different beams. The PDSCH is received in a different beam because the UE had performed a beam switch. In operation 1335, the UE can receive at least one of DMRS, PT-RS, CSI-RS or TRS. In operation 1340, the UE can estimate the carrier frequency offset (CFO) and Doppler shift based on a previously active beam. In operation 1345, the UE can receive at least one of CSI-RS or TRS from the gNB. In operation 1350, the UE can switch default Rx beam. In operation 1355, the UE can receive at least one of CSI-RS or TRS from the gNB. In operation 1360, the UE re-estimates the UE can estimate the carrier frequency offset (CFO) and Doppler shift based on a previously active beam.

The UE 801 receives a physical downlink control channel (PDCCH), which is followed by a physical downlink shared channel (PDSCH). As depicted in FIG. 13, the PDCCH and PDSCH messages are received by the UE 801 in different beams. The PDSCH is received in a different beam because the UE 801 had performed a beam switch, which is performed either because the best receiver beam is updated based on reference signal based measurements or because the transmitter beam for PDSCH is different, as indicated by PDCCH. Once the beam switching is performed, the current beam is considered as the serving beam. The UE 801 can estimate the Doppler shift corresponding to the current beam (serving beam) based on the value of Doppler shift of the previous beam (previous serving beam), which was estimated based on the reference signals.

Figure 14:
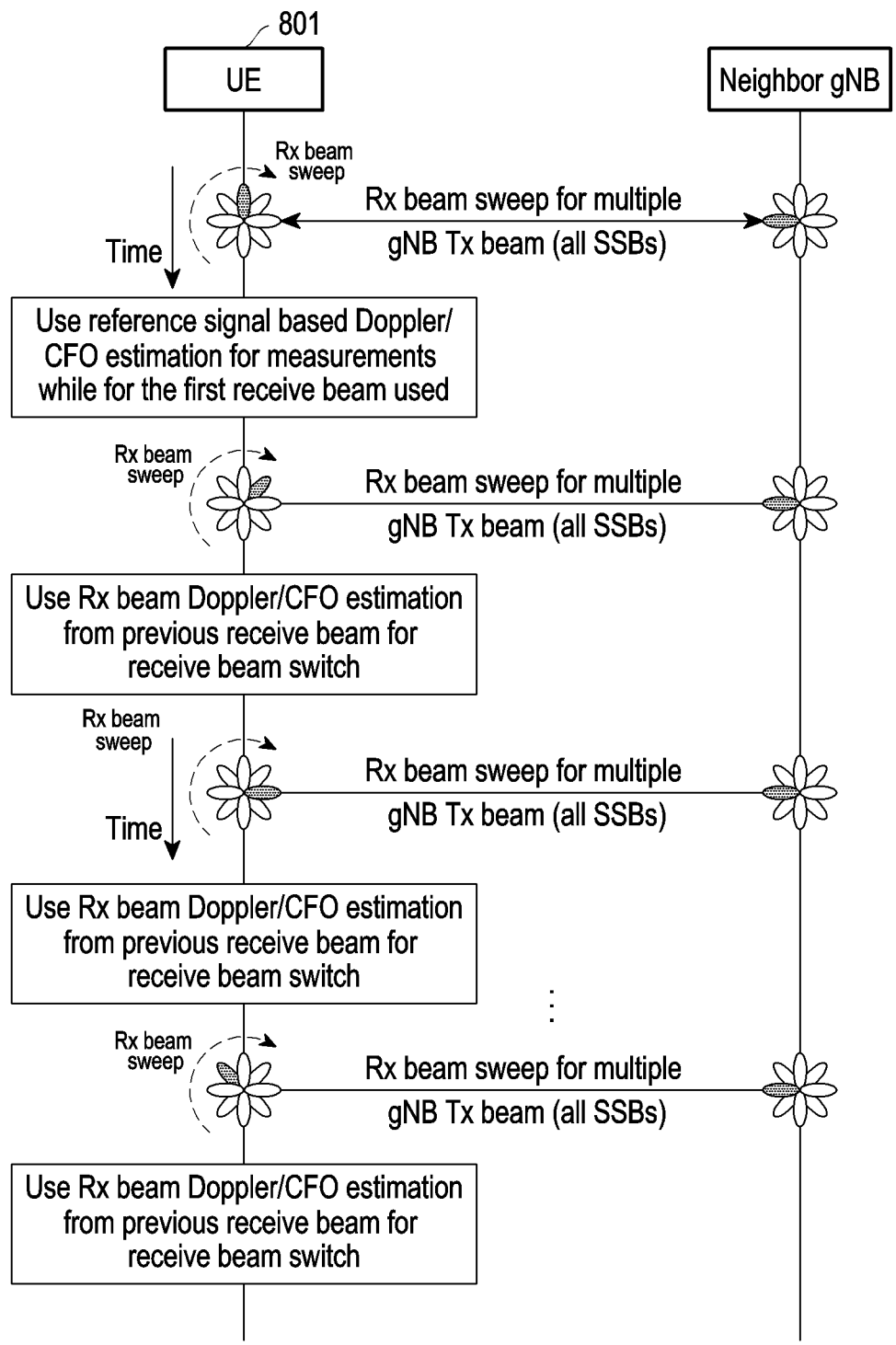
FIG. 14 is a sequence diagram depicting estimation of Doppler shift of a serving beam in an event of beam switching by a UE for performing measurement of signals of neighboring cells according to an embodiment of the disclosure.

FIG. 14 is a sequence diagram depicting estimation of Doppler shift of a serving beam in an event of beam switching by a UE for performing measurement of signals of neighboring cells according to an embodiment of the disclosure.

Referring to FIG. 14, the UE 801 can perform measurements of signals received from the neighboring gNB (cell) for target cell selection during a handover procedure, or when the UE 801 attempts to connect to a neighboring cell to receive some service. Consider that the UE 801 acts as a receiver device. The UE 801 can perform a receiver beam sweep, wherein the UE 801 can perform measurement of the signals received from the neighboring gNB using all the beams. Initially, the UE 801 can perform the measurements using a first beam. Thereafter, the UE 801 can perform beam switching and perform signal measurement using a second beam. Similarly, the UE 801 perform measurement of the signals received from the neighboring gNB using all the beams available to the UE 801. During each beam switch, the UE 801 can estimate the Doppler shift for a beam using the value of Doppler shift estimated for a previous beam. The UE 801 can similarly measure the signals received from other neighboring gNBs to enable faster switching.

Figure 15:
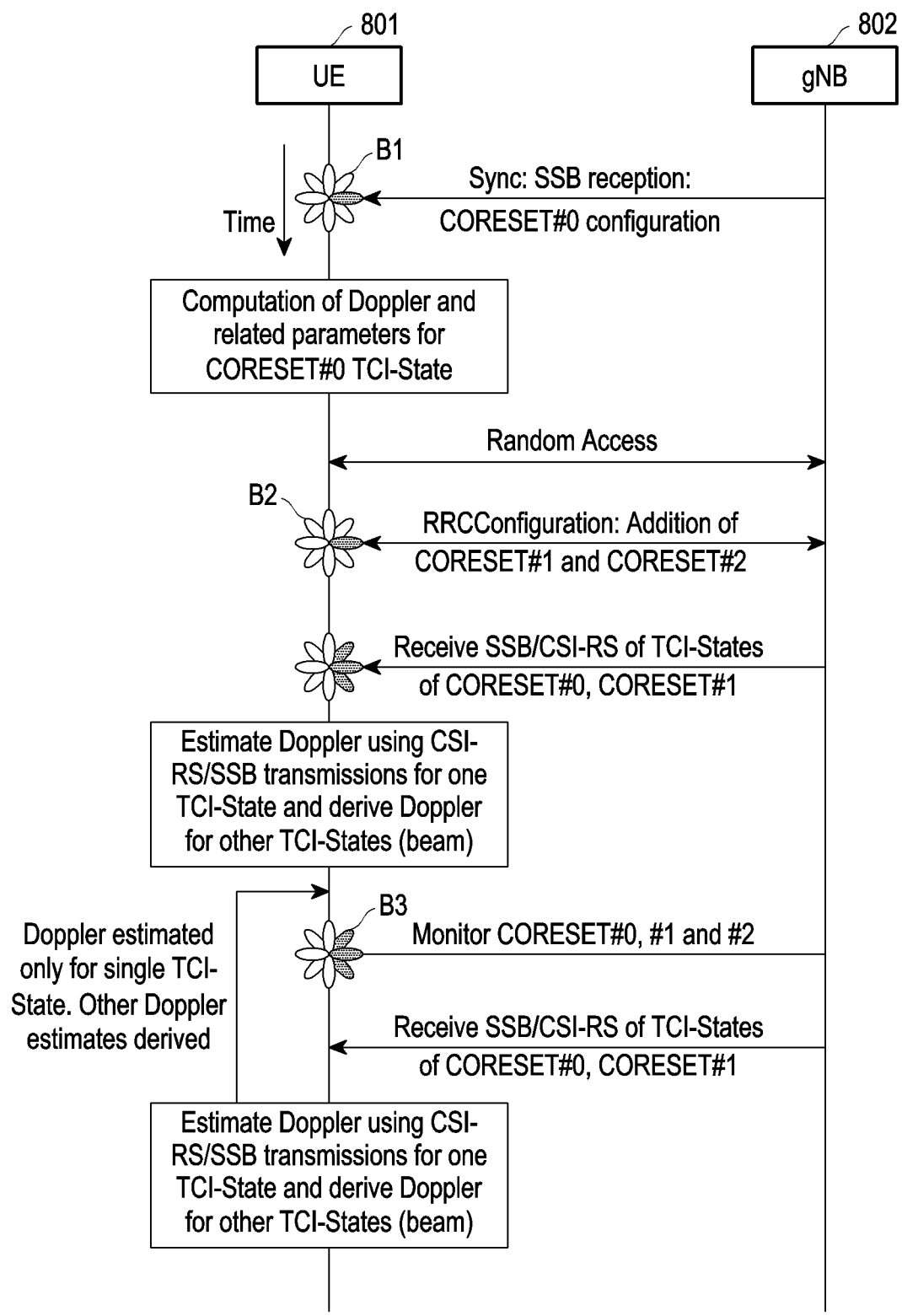
FIG. 15 is a sequence diagram depicting estimation of Doppler shift of a plurality of beams, receiving independent physical downlink control channel (PDCCH) messages, based on an estimated Doppler shift of one of the plurality of beams according to an embodiment of the disclosure.

FIG. 15 is a sequence diagram depicting estimation of Doppler shift of a plurality of beams, receiving independent physical downlink control channel (PDCCH) messages based on an estimated Doppler shift of one of the plurality of beams according to an embodiment of the disclosure.

The UE 801 can utilize multiple beams to communicate with the gNB 802. The UE 801 can receive individual PDCCH messages through each of the beams.

Referring to FIG. 15, the UE 801 can receive three independent PDCCH messages, along with resource configurations and periodicity configurations using three beams, viz., B1, B2, and B3 beam. The PDCCH messages can be received with same or different periodicities in each of the different beams. The UE 801 can estimate the Doppler shift of one of the beams, say B1, using reference signals. If the QCL of the beams B1, B2, and B3, are of type A, B, or C, the UE 801 can utilize the estimate of Doppler shift of beam B1 and sensor data to estimate the Doppler shift of the beam B2 and B3, wherein the sensor data can include velocity of the UE 801, and an angle between the unit vector along the direction of motion of the UE 801 and the direction of the beams.

The gNB 802 can initially send a first PDCCH message and the UE 801 can receive the first PDCCH message using the beam B1. The UE 801 can estimate the Doppler shift for the beam B1 using the reference signals. Thereafter, the gNB 802 can send a second PDCCH message and a third PDCCH message. Once reception of the second and third PDCCH messages is initiated, the UE 801 can estimate the values of Doppler shift for the beams B2 and B3 using the estimated Doppler shift for the beam B1.

Figure 16:
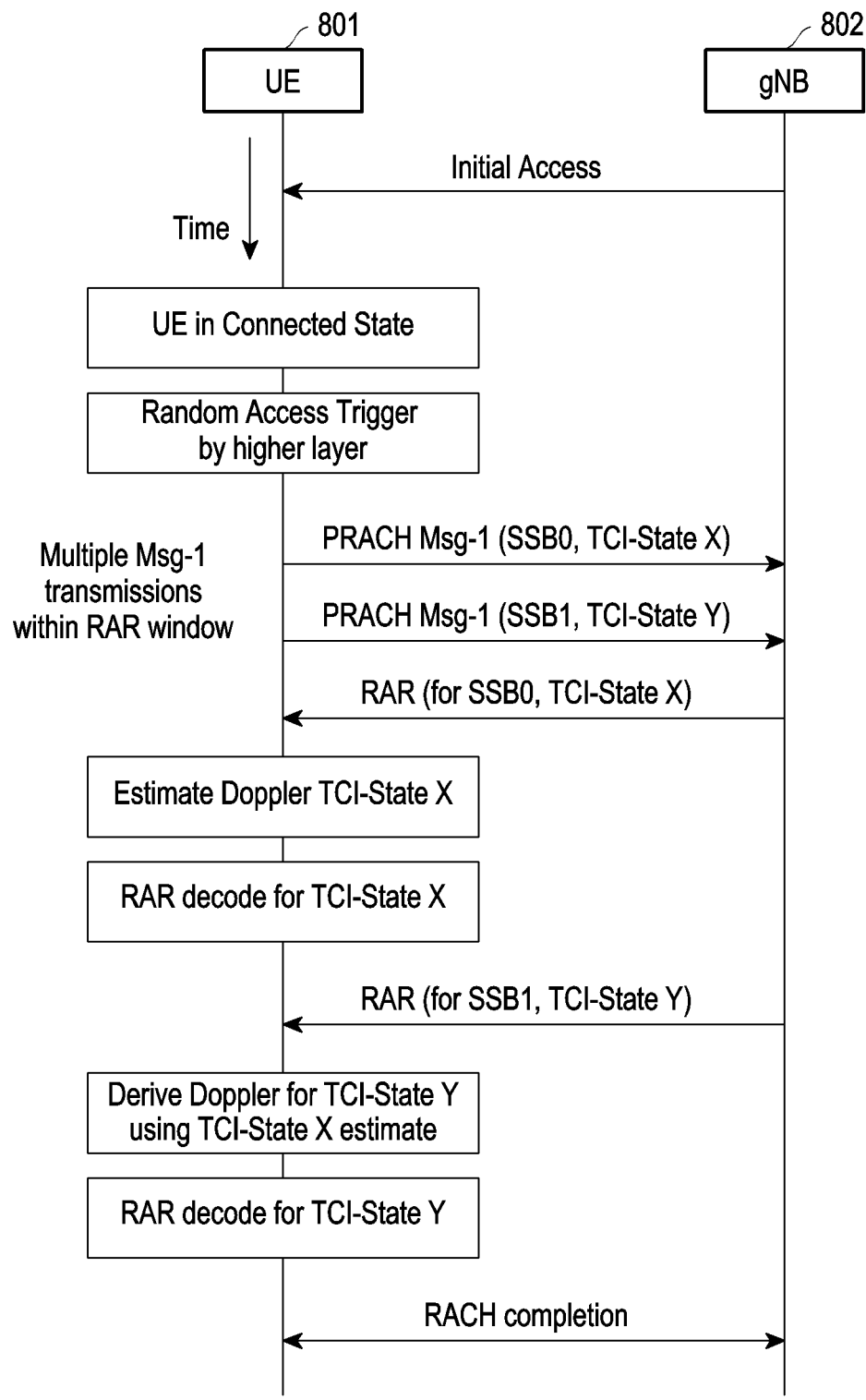
FIG. 16 is a sequence diagram depicting estimation of Doppler shift of a plurality of beams, receiving random access response (RAR) messages from a gNB, based on an estimated Doppler shift of one of the plurality of beams according to an embodiment of the disclosure.

FIG. 16 is a sequence diagram depicting estimation of Doppler shift of a plurality of beams, receiving random access response (RAR) messages from a gNB 802, based on an estimated Doppler shift of one of the plurality of beams, according to embodiments as disclosed herein.

Referring to FIG. 16, once the UE 801 registers with the gNB 802 and is granted access to resources, the UE 801 (in CONNECTED state) can trigger random access. The UE 801 can perform physical random access channel (PRACH) preamble transmissions (msg-1) multiple times within a RAR window corresponding to the first transmission. Once the RAR response is received using the serving beam, the UE 801 can estimate Doppler shift using reference signals for the serving beam and decode the RAR response. Thereafter, the UE 801 can monitor for msg-2 or RAR receptions along different beams. In such scenarios, the UE 801 can estimate the values of Doppler shift for the different beams based on the Doppler shift estimated for the previous serving beam and sensor data. Further, when msg-1 transmission is attempted using different transmit beams, which may be indicated by the TCI-State configurations, the Doppler shift estimation during first RAR reception needs to be performed using the reference signals. For subsequent RAR receptions, the Doppler estimate can be derived based on the previous estimate of Doppler shift (estimated during reception of the first RAR) and sensor data.

Figure 17:
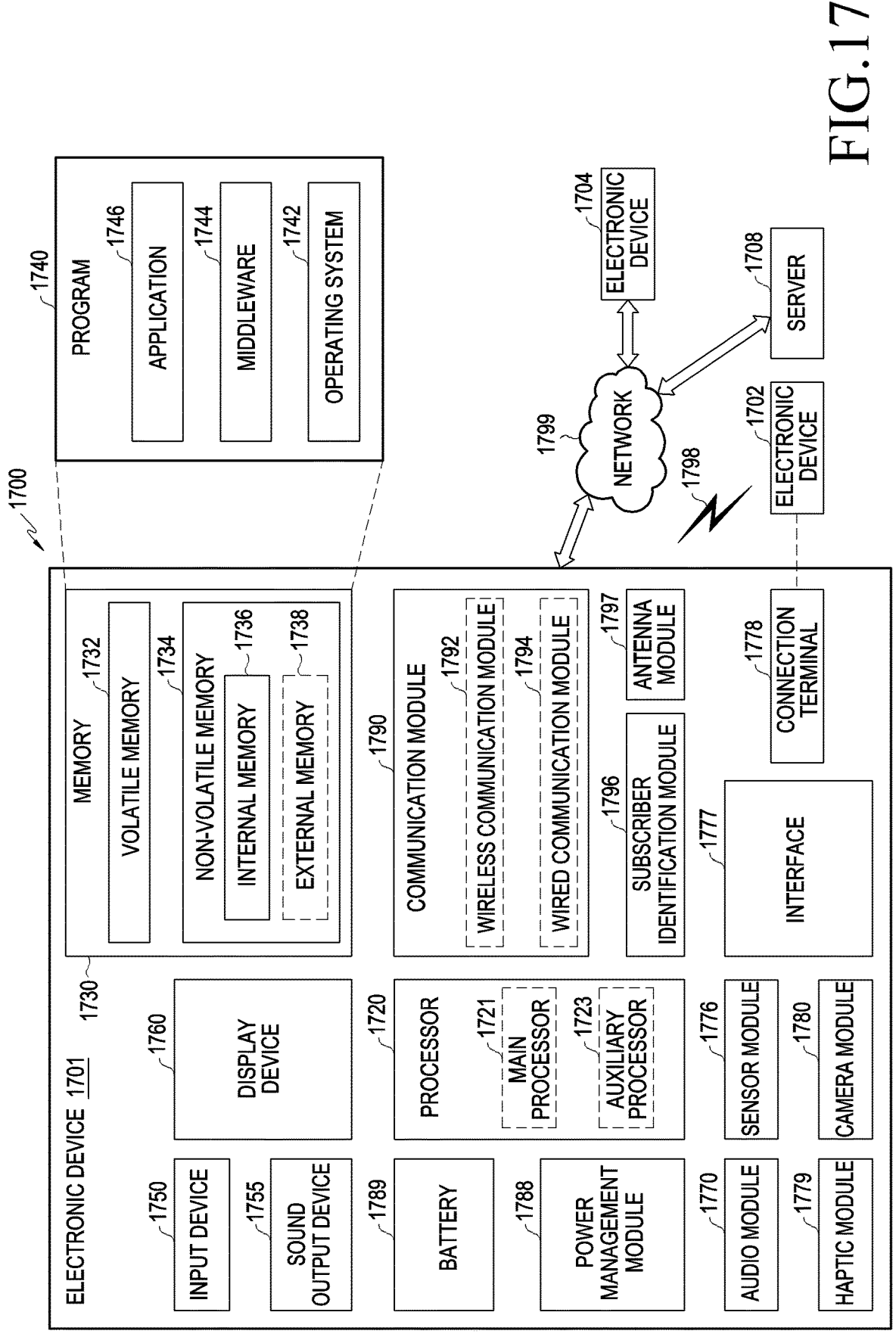
FIG. 17 is a block diagram illustrating an electronic device (for example, one or more UEs) in a network environment according to an embodiment of the disclosure.

FIG. 17 is a block diagram illustrating an electronic device (for example, one or more UEs) 1601 in a network environment according to various embodiments.

Referring to FIG. 17, an electronic device 1701 in a network environment 1700 may communicate with an electronic device 1702 via a first network 1798 (e.g., a short-range wireless communication network), or an electronic device 1704 or a server 1708 via a second network 1799 (e.g., a long-range wireless communication network). According to an embodiment of the disclosure, the electronic device 1701 may communicate with the electronic device 1704 via the server 1708. According to an embodiment of the disclosure, the electronic device 1701 may include a processor 1720, memory 1730, an input device 1750, a sound output device 1755, a display device 1760, an audio module 1770, a sensor module 1776, an interface 1777, a haptic module 1779, a camera module 1780, a power management module 1788, a battery 1789, a communication module 1790, a subscriber identification module (SIM) 1796, or an antenna module 1797. In some embodiments of the disclosure, at least one (e.g., the display device 1760 or the camera module 1780) of the components may be omitted from the electronic device 1601, or one or more other components may be added in the electronic device 1601. In some embodiments of the disclosure, some of the components may be implemented as single integrated circuitry. For example, the sensor module 1776 (e.g., a fingerprint sensor, an iris sensor, or an illuminance sensor) may be implemented as embedded in the display device 1760 (e.g., a display).

The processor 1720 may execute, for example, software (e.g., a program 1740) to control at least one other component (e.g., a hardware or software component) of the electronic device 1701 coupled with the processor 1720, and may perform various data processing or computation. According to one embodiment of the disclosure, as at least part of the data processing or computation, the processor 1720 may load a command or data received from another component (e.g., the sensor module 1776 or the communication module 1790) in volatile memory 1732, process the command or the data stored in the volatile memory 1632, and store resulting data in non-volatile memory 1734 (e.g., an internal memory 1736 or an external memory 1738). According to an embodiment of the disclosure, the processor 1720 may include a main processor 1721 (e.g., a central processing unit (CPU) or an application processor (AP)), and an auxiliary processor 1723 (e.g., a graphics processing unit (GPU), an image signal processor (ISP), a sensor hub processor, or a communication processor (CP)) that is operable independently from, or in conjunction with, the main processor 1721. Additionally or alternatively, the auxiliary processor 1723 may be adapted to consume less power than the main processor 1721, or to be specific to a specified function. The auxiliary processor 1723 may be implemented as separate from, or as part of the main processor 1721.

The auxiliary processor 1723 may control at least some of functions or states related to at least one component (e.g., the display device 1760, the sensor module 1776, or the communication module 1790) among the components of the electronic device 1701, instead of the main processor 1721 while the main processor 1721 is in an inactive (e.g., sleep) state, or together with the main processor 1721 while the main processor 1721 is in an active state (e.g., executing an application). According to an embodiment of the disclosure, the auxiliary processor 1723 (e.g., an image signal processor or a communication processor) may be implemented as part of another component (e.g., the camera module 1780 or the communication module 1790) functionally related to the auxiliary processor 1723.

The memory 1730 may store various data used by at least one component (e.g., the processor 1720 or the sensor module 1776) of the electronic device 1701. The various data may include, for example, software (e.g., the program 1740) and input data or output data for a command related thereto. The memory 1730 may include the volatile memory 1732 or the non-volatile memory 1634.

The program 1740 may be stored in the memory 1730 as software, and may include, for example, an operating system (OS) 1742, middleware 1744, or an application 1746.

The input device 1750 may receive a command or data to be used by other component (e.g., the processor 1720) of the electronic device 1701, from the outside (e.g., a user) of the electronic device 1601. The input device 1750 may include, for example, a microphone, a mouse, a keyboard, or a digital pen (e.g., a stylus pen).

The sound output device 1755 may output sound signals to the outside of the electronic device 1701. The sound output device 1755 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 1760 may visually provide information to the outside (e.g., a user) of the electronic device 1701. The display device 1760 may include, for example, a display, a hologram device, or a projector and control circuitry to control a corresponding one of the display, hologram device, and projector. According to an embodiment of the disclosure, the display device 1760 may include touch circuitry adapted to detect a touch, or sensor circuitry (e.g., a pressure sensor) adapted to measure the intensity of force incurred by the touch.

The audio module 1770 may convert a sound into an electrical signal and vice versa. According to an embodiment of the disclosure, the audio module 1770 may obtain the sound via the input device 1750, or output the sound via the sound output device 1755 or a headphone of an external electronic device (e.g., an electronic device 1702) directly (e.g., wiredly) or wirelessly coupled with the electronic device 1701.

The sensor module 1776 may detect an operational state (e.g., power or temperature) of the electronic device 1701 or an environmental state (e.g., a state of a user) external to the electronic device 1701, then generate an electrical signal or data value corresponding to the detected state. According to an embodiment of the disclosure, the sensor module 1776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1777 may support one or more specified protocols to be used for the electronic device 1701 to be coupled with the external electronic device (e.g., the electronic device 1702) directly (e.g., wiredly) or wirelessly. According to an embodiment of the disclosure, the interface 1777 may include, for example, a high definition multimedia interface (HDMI), a universal serial bus (USB) interface, a secure digital (SD) card interface, or an audio interface.

A connecting terminal 1778 may include a connector via which the electronic device 1701 may be physically connected with the external electronic device (e.g., the electronic device 1702). According to an embodiment of the disclosure, the connecting terminal 1778 may include, for example, a HDMI connector, a USB connector, a SD card connector, or an audio connector (e.g., a headphone connector).

The haptic module 1779 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1779 may include, for example, a motor, a piezoelectric element, or an electric stimulator.

The camera module 1780 may capture a still image or moving images. According to an embodiment of the disclosure, the camera module 1780 may include one or more lenses, image sensors, image signal processors, or flashes.

The power management module 1788 may manage power supplied to the electronic device 1701. According to one embodiment of the disclosure, the power management module 1788 may be implemented as at least part of, for example, a power management integrated circuit (PMIC).

The battery 1789 may supply power to at least one component of the electronic device 1701. According to an embodiment of the disclosure, the battery 1789 may include, for example, a primary cell which is not rechargeable, a secondary cell which is rechargeable, or a fuel cell.

The communication module 1790 may support establishing a direct (e.g., wired) communication channel or a wireless communication channel between the electronic device 1701 and the external electronic device (e.g., the electronic device 1702, the electronic device 1704, or the server 1708) and performing communication via the established communication channel. The communication module 1790 may include one or more communication processors that are operable independently from the processor 1720 (e.g., the application processor (AP)) and supports a direct (e.g., wired) communication or a wireless communication. According to an embodiment of the disclosure, the communication module 1790 may include a wireless communication module 1792 (e.g., a cellular communication module, a short-range wireless communication module, or a global navigation satellite system (GNSS) communication module) or a wired communication module 1794 (e.g., a local area network (LAN) communication module or a power line communication (PLC) module). A corresponding one of these communication modules may communicate with the external electronic device via the first network 1798 (e.g., a short-range communication network, such as Bluetooth™, wireless-fidelity (Wi-Fi) direct, or infrared data association (IrDA)) or the second network 1799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1792 may identify and authenticate the electronic device 1701 in a communication network, such as the first network 1798 or the second network 1799, using subscriber information (e.g., international mobile subscriber identity (IMSI)) stored in the subscriber identification module 1796.

The antenna module 1797 may transmit or receive a signal or power to or from the outside (e.g., the external electronic device) of the electronic device 1701. According to an embodiment of the disclosure, the antenna module 1797 may include an antenna including a radiating element including a conductive material or a conductive pattern formed in or on a substrate (e.g., a PCB). According to an embodiment of the disclosure, the antenna module 1797 may include a plurality of antennas. In such a case, at least one antenna appropriate for a communication scheme used in the communication network, such as the first network 498 or the second network 1799, may be selected, for example, by the communication module 1790 (e.g., the wireless communication module 1792) from the plurality of antennas. The signal or the power may then be transmitted or received between the communication module 1790 and the external electronic device via the selected at least one antenna. According to an embodiment of the disclosure, another component (e.g., a radio frequency integrated circuit (RFIC)) other than the radiating element may be additionally formed as part of the antenna module 1797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1701 and the external electronic device 1704 via the server 1708 coupled with the second network 1799. Each of the electronic devices 1702 and 1704 may be a device of a same type as, or a different type, from the electronic device 1701. According to an embodiment of the disclosure, all or some of operations to be executed at the electronic device 1701 may be executed at one or more of the external electronic devices 1702, 1704, or 1708. For example, if the electronic device 401 should perform a function or a service automatically, or in response to a request from a user or another device, the electronic device 1701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 1701 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents

The invention claimed is:

1. A method for frequency offset tracking in a millimeter wave communication system, the method comprising:
   estimating, by a user equipment (UE), Doppler shift for at least one beam based on at least one of data obtained from sensors in the UE and reference signals obtained from a base station;
   performing, by the UE, a beam switching from a first beam to a second beam, wherein the first beam is a reception beam related to a previous transmission beam and the second beam is a reception beam related to a current transmission beam;
   after performance of the beam switching, determining Doppler shift for the second beam is estimated;
   in case that the Doppler shift for the second beam is estimated, estimating, by the UE, Doppler shift for a plurality of reception beams related to the current transmission beam based on the estimated Doppler shift for the second beam and the data obtained from sensors in the UE;
   in case that the Doppler shift for the second beam is not estimated, determining Doppler shift for the first beam is estimated;
   in response to the Doppler shift for the first beam not being estimated, estimating, by the UE, Doppler shift for the second beam based on the data obtained from sensors in the UE and the reference signals, and estimating Doppler shift for the plurality of reception beams related to the current transmission beam based on the estimated Doppler shift for the second beam and the data obtained from sensors in the UE; and
   in response to the Doppler shift for the first beam being estimated, estimating, by the UE, Doppler shift for a plurality of reception beams related to the previously transmission based on the estimated Doppler shift for the first beam and the data obtained from sensors in the UE, and estimating Doppler shift for the second beam based on the estimated Doppler shift for the plurality of reception beams related to the previously transmission and the data obtained from sensors in the UE,
   wherein type of quasi co-location (QCL) of the first beam and type of QCL of the second beam is one of A, B, and C.

2. The method of claim 1, wherein the sensor data comprises of a velocity of motion of the UE with respect to the base station, an angle between direction of the first beam and an unit vector along direction of motion of the UE, an angle between direction of the second beam and the unit vector along direction of motion of the UE, and angle between the first beam and the second beam.

3. The method of claim 2, wherein the velocity of motion of the UE is computed based on the Doppler shift for the first beam and the Doppler shift for the second beam, obtained from the reference signals, angle between direction of the first beam and the unit vector along direction of motion of the UE, and angle between the first beam and the second beam.

4. The method of claim 1, wherein the UE receives a physical downlink control channel (PDCCH) message through the first beam and a physical downlink shared channel (PDSCH) message through the second beam.

5. The method of claim 1, wherein the UE receives a first PDCCH message through the first beam and a second PDCCH message through the second beam.

6. The method of claim 1, wherein the UE receives data from a first transmitter beam through the first beam and receives data from a second transmitter beam through the second beam.

7. The method of claim 1, wherein the UE performs measurement of signals received from at least one neighboring cell through the first beam and the second beam.

8. The method of claim 1, wherein the UE receives a first random access response (RAR) message, corresponding to transmission of first physical random access channel (PRACH) message, through the first beam, and second RAR message, corresponding to transmission of a second PRACH message, through the second beam.

9. A user equipment (UE) for tracking frequency offset in a millimeter wave communication system, the UE configured to:
   estimate Doppler shift for at least one beam based on at least one of data obtained from sensors in the UE and reference signals obtained from a base station,
   perform a beam switching from a first beam to a second beam, wherein the first beam is a reception beam related to a previous transmission beam and the second beam is a reception beam related to a current transmission beam;
   after performance of the beam switching, determine Doppler shift for the second beam is estimated;
   in case that the Doppler shift for the second beam is estimated, estimate Doppler shift for a plurality of reception beams related to the current transmission beam based on the estimated Doppler shift for the second beam and the data obtained from sensors in the UE;

in case that the Doppler shift for the second beam is not estimated, determine Doppler shift for the first beam is estimated;

in response to the Doppler shift for the first beam not being estimated, estimate Doppler shift for the second beam based on the data obtained from sensors in the UE and the reference signals, and estimate Doppler shift for the plurality of reception beams related to the current transmission beam based on the estimated Doppler shift for the second beam and the data obtained from sensors in the UE; and in response to the Doppler shift for the first beam being estimated, Doppler shift for a plurality of reception beams related to the previously transmission based on the estimated Doppler shift for the first beam and the data obtained from sensors in the UE, and estimate Doppler shift for the second beam based on the estimated Doppler shift for the plurality of reception beams related to the previously transmission and the data obtained from sensors in the UE, wherein type of quasi co-location (QCL) of the first beam and type of QCL of the second beam is one of A, B, and C.

10. The UE of claim 9, wherein the sensor data comprises of a velocity of motion of the UE with respect to the base station, an angle between direction of the first beam and an unit vector along direction of motion of the UE, an angle between direction of the second beam and the unit vector along direction of motion of the UE, and angle between the first beam and the second beam.

11. The UE of claim 10, wherein the velocity of motion of the UE is computed based on the Doppler shift for the first beam and the Doppler shift for the second beam, obtained from the reference signals; angle between direction of the first beam and the unit vector along direction of motion of the UE, and angle between the first beam and the second beam.

12. The UE, of claim 9, wherein the UE receives a physical downlink control channel (PDCCH) message through the first beam and a physical downlink shared channel (PDSCH) message through the second beam.

13. The UE of claim 9, wherein the UE receives a first PDCCH message through the first beam and a second PDCCH message through the second beam.

14. One or more non-transitory computer-readable storage media storing one or more programs including instructions that, when executed by one or more processors of a device, cause the device to perform operations, the operations comprising:

estimating, by a user equipment (UE), Doppler shift for at least one beam based on at least one of data obtained from sensors in the UE and reference signals obtained from a base station;

performing, by the UE, a beam switching from a first beam to a second beam, wherein the first beam is a reception beam related to a previous transmission beam and the second beam is a reception beam related to a current transmission beam;

after performance of the beam switching, determining Doppler shift for the second beam is estimated;

in case that the Doppler shift for the second beam is estimated, estimating, by the UE, Doppler shift for a plurality of reception beams related to the current transmission beam based on the estimated Doppler shift for the second beam and the data obtained from sensors in the UE;

in case that the Doppler shift for the second beam is not estimated, determining Doppler shift for the first beam is estimated;

in response to the Doppler shift for the first beam not being estimated, estimating, by the UE, Doppler shift for the second beam based on the data obtained from sensors in the UE and the reference signals, and estimating Doppler shift for the plurality of reception beams related to the current transmission beam based on the estimated Doppler shift for the second beam and the data obtained from sensors in the UE; and in response to the Doppler shift for the first beam being estimated, estimating, by the UE, Doppler shift for a plurality of reception beams related to the previously transmission based on the estimated Doppler shift for the first beam and the data obtained from sensors in the UE, and estimating Doppler shift for the second beam based on the estimated Doppler shift for the plurality of reception beams related to the previously transmission and the data obtained from sensors in the UE, wherein type of quasi co-location (QCL) of the first beam and type of QCL of the second beam is one of A, B, and C.

15. The one or more non-transitory computer-readable storage media of claim 14, wherein the sensor data comprises of a velocity of motion of the UE with respect to the base station, an angle between direction of the first beam and an unit vector along direction of motion of the UE, an angle between direction of the second beam and the unit vector along direction of motion of the UE, and angle between the first beam and the second beam.

16. The one or more non-transitory computer-readable storage media of claim 15, wherein the velocity of motion of the UE is computed based on the Doppler shift for the first beam and the Doppler shift for the second beam, obtained from the reference signals, angle between direction of the first beam and the unit vector along direction of motion of the UE, and angle between the first beam and the second beam.

* * * * *